US012693501B2

(12) United States Patent
Kwon

(10) Patent No.: US 12,693,501 B2
(45) Date of Patent: Jul. 28, 2026

(54) OPTICAL SYSTEM

(71) Applicant: LG INNOTEK CO., LTD., Seoul (KR)

(72) Inventor: Duk Keun Kwon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 333 days.

(21) Appl. No.: 18/259,005

(22) PCT Filed: Dec. 22, 2021

(86) PCT No.: PCT/KR2021/019638
§ 371 (c)(1),
(2) Date: Jun. 22, 2023

(87) PCT Pub. No.: WO2022/139473
PCT Pub. Date: Jun. 30, 2022

(65) Prior Publication Data
US 2024/0310606 A1 Sep. 19, 2024

(30) Foreign Application Priority Data
Dec. 22, 2020 (KR) ........................ 10-2020-0180578

(51) Int. Cl.
*G02B 13/00* (2006.01)
*G02B 9/64* (2006.01)
(52) U.S. Cl.
CPC .......... *G02B 13/0045* (2013.01); *G02B 9/64* (2013.01)
(58) Field of Classification Search
None
See application file for complete search history.

(56) References Cited

U.S. PATENT DOCUMENTS 11,016,272 B2 5/2021 Hirano
11,460,678 B2 10/2022 Wang et al.
(Continued)

FOREIGN PATENT DOCUMENTS

CN 111427134 A * 7/2020 ............. G02B 13/18
CN 111812811 A 10/2020
(Continued)

OTHER PUBLICATIONS

Supplementary European Search Report dated Aug. 30, 2024 in European Application No. 21911540.9.
(Continued)

*Primary Examiner* — Shan Liu
(74) *Attorney, Agent, or Firm* — SALIWANCHIK, LLOYD & EISENSCHENK

(57) ABSTRACT

An optical system disclosed to an embodiment of the invention includes a first lens, a second lens, a third lens, a fourth lens, a fifth lens, a sixth lens, a seventh lens, an eighth lens, and a ninth lens which are sequentially arranged along an optical axis from an object side to an image side, wherein the first lens has an object-side surface convex, the second lens has positive refractive power, the second lens has a positive refractive power and has a convex object-side surface, the third lens has a negative refractive power and has a concave image-side surface, the eighth lens has a positive refractive power and at least one of an object-side surface and an image-side surface of the eighth lens has at least one inflection point, and the ninth lens has negative refractive power, an object-side surface and an image-side surface of the ninth lens have at least one inflection point.

18 Claims, 15 Drawing Sheets

(56) References Cited

U.S. PATENT DOCUMENTS

| | | | |
|---|---|---|---|
| 11,493,735 | B2 | 11/2022 | Hirano |
| 11,561,378 | B2 | 1/2023 | Hirano |
| 11,579,412 | B2 | 2/2023 | Hsueh et al. |
| 11,579,418 | B2 | 2/2023 | Hirano |
| 11,586,020 | B2 | 2/2023 | Hirano |
| 11,592,648 | B2 | 2/2023 | Hirano |
| 11,592,649 | B2 | 2/2023 | Hirano |
| 11,604,336 | B2 | 3/2023 | Hirano |
| 11,747,596 | B2 | 9/2023 | Hirano |
| 11,754,812 | B2 | 9/2023 | Hirano |
| 11,774,714 | B2 | 10/2023 | Lin et al. |
| 11,835,695 | B2 | 12/2023 | Hsueh et al. |
| 11,906,714 | B2 | 2/2024 | Wang et al. |
| 11,966,026 | B2 | 4/2024 | Shi |
| 12,055,793 | B2 | 8/2024 | Lin et al. |
| 12,105,256 | B2 | 10/2024 | Zhao |
| 12,436,370 | B2 | 10/2025 | Hsueh et al. |
| 2009/0273851 | A1 | 11/2009 | Take et al. |
| 2011/0170203 | A1 | 7/2011 | Murayama et al. |
| 2020/0249437 | A1 | 8/2020 | Hirano |
| 2020/0285028 | A1 | 9/2020 | Hirano |
| 2020/0393648 | A1 | 12/2020 | Lin et al. |
| 2021/0396955 | A1 | 12/2021 | Okano et al. |
| 2022/0066148 | A1* | 3/2022 | Zhao .................. G02B 13/0045 |
| 2022/0113503 | A1* | 4/2022 | Si ............................ G02B 9/64 |
| 2022/0113505 | A1* | 4/2022 | Wang .................... G02B 13/06 |
| 2022/0113514 | A1 | 4/2022 | Shi |
| 2024/0337815 | A1 | 10/2024 | Lin et al. |

FOREIGN PATENT DOCUMENTS

| | | | | | |
|---|---|---|---|---|---|
| CN | 111929852 | A | | 11/2020 | |
| CN | 212009117 | U | | 11/2020 | |
| CN | 112014951 | A | | 12/2020 | |
| CN | 112014952 | A | | 12/2020 | |
| CN | 112014953 | A | | 12/2020 | |
| JP | 2020-64173 | A | | 4/2020 | |
| JP | 2020109436 | A | * | 7/2020 | ......... G02B 13/0045 |
| JP | 2020-126183 | A | | 8/2020 | |
| KR | 10-2009-0087422 | A | | 8/2009 | |
| KR | 10-2011-0083548 | A | | 7/2011 | |
| KR | 10-2016-0075235 | A | | 6/2016 | |
| TW | I709777 | B | | 11/2020 | |
| TW | I712830 | B | | 12/2020 | |

OTHER PUBLICATIONS

International Search Report dated Apr. 20, 2022 in International Application No. PCT/KR2021/019638.

Office Action dated Oct. 22, 2025 in Taiwanese Application No. 110148239.

Office Action dated Feb. 3, 2026 in Japanese Application No. 2023-538100.

* cited by examiner

OPTICAL SYSTEM

CROSS-REFERENCE TO RELATED APPLICATIONS

This application is the U.S. national stage application of International Patent Application No. PCT/KR2021/019638, filed Dec. 22, 2021, which claims the benefit under 35 U.S.C. § 119 of Korean Application No. 10-2020-0180578, filed Dec. 22, 2020, the disclosures of each of which are incorporated herein by reference in their entirety.

TECHNICAL FIELD

The embodiment relates to an optical system for high resolution.

BACKGROUND ART

The camera module captures an object and stores it as an image or video, and is installed in various applications. In particular, the camera module is produced in a very small size and is applied to not only portable devices such as smartphones, tablet PCs, and laptops, but also drones and vehicles to provide various functions. For example, the optical system of the camera module may include an imaging lens for forming an image, and an image sensor for converting the formed image into an electrical signal. In this case, the camera module may perform an autofocus (AF) function of aligning the focal lengths of the lenses by automatically adjusting the distance between the image sensor and the imaging lens, and may perform a zooning function of zooming up or zooning out by increasing or decreasing the magnification of a remote object through a zoom lens. In addition, the camera module employs an image stabilization (IS) technology to correct or inhibit image stabilization due to an unstable fixing device or a camera movement caused by a user's movement.

The most important element for this camera module to obtain an image is an imaging lens that forms an image. Recently, interest in high performance such as high image quality and high resolution is increasing, and research on an optical system including 5 or 6 lenses is being conducted in order to realize this. For example, research using a plurality of imaging lenses having positive (+) and/or negative (−) refractive power to implement a high-performance optical system is being conducted. However, when arranging a plurality of lenses, there is a problem in that it is difficult to derive excellent optical properties and aberration properties. Therefore, a new optical system capable of solving the above-described problem is required.

DISCLOSURE

Technical Problem

An embodiment of the invention is to provide an optical system with improved optical properties. An embodiment of the invention is to provide an optical system having at least nine lenses. An embodiment of the invention is to provide an optical system in which at least two lenses having positive (+) refractive power and at least two lenses having negative (−) refractive power are aligned with respect to an optical axis among at least nine lenses.

Technical Solution

An optical system according to an embodiment of the invention comprises a first lens, a second lens, a third lens, a fourth lens, a fifth lens, a sixth lens, a seventh lens, an eighth lens, and a ninth lens which are sequentially arranged along the optical axis from the object side to the image side, wherein the first lens has a convex object-side surface, the second lens has a convex object-side surface, and the third lens has positive refractive power and has a convex object-side surface, the fourth lens has negative refractive power and has a concave image-side surface, the eighth lens has positive refractive power and has at least one of an object-side surface and an image-side surface having at least one inflection point, and the ninth lens may have negative refractive power and have an object-side surface and an image-side surface which have at least one inflection point.

According to an embodiment of the invention, a center thickness of the third lens may be thicker than a center thickness of each of the first, second, and fourth to sixth lenses.

According to an embodiment of the invention, the refractive indices of the fourth, sixth, and eighth lenses may be greater than the refractive indices of the first, second, third, fifth, seventh and ninth lenses. The Abbe number of the first, second, third, fifth, seventh, and ninth lenses may be 50 or more, and the Abbe number of the fourth and sixth lenses may be less than 30. At least one of the first, second, fifth, sixth, and seventh lenses may have positive or negative refractive power.

According to an embodiment of the invention, an image sensor on an image side of the ninth lens; and an optical filter between the image sensor and the ninth lens are included, wherein the optical system satisfies Equations 1 and 2: [Equation 1] $0 < BFL/TTL < 0.3$ and [Equation 2] $0 < BFL/Img < 0.3$, where BFL is a distance from an apex of the image-side surface of the ninth lens to the image sensor, TTL is a distance from the apex of the object-side first surface of the first lens to the image sensor, and Img is may be a vertical distance from the optical axis to 1.0F, which is a diagonal end on the image sensor.

According to an embodiment of the invention, an image sensor on an image side of the ninth lens and an optical filter between the image sensor and the ninth lens are included, and the optical system satisfies Equations 3, 4 and 5: [Equation 3] $0.5 < F/TTL < 1.2$, [Equation 4] $0.5 < TTL/(Img \times 2) < 0.8$, and [Equation 5] $0.5 < TTL/(D92 \times 2) < 1.2$, wherein TTL is a distance from the apex of the object-side first surface of the first lens to the image sensor, where F is the total effective focal length of the optical system, Img is a vertical distance from the optical axis to 1.0F, which is a diagonal end on the image sensor, and D92 may be a distance from the apex of the image side of the ninth lens on the optical axis to the effective diameter.

According to an embodiment of the invention, a radius of curvature of the object-side surface of the third lens is L3R1 and an absolute value of the radius of curvature of the image-side surface of the third lens is defined as |L3R2|, the relationship of $0 < L3R1/|L3R2| < 1$ may be satisfied. The absolute value of the radius of curvature of the object-side surface of the fourth lens is |L4R1| and the radius of curvature of the image-side surface of the fourth lens is L4R2, the relationship of $0 < L4R2/|L4R1| < 1$ may be satisfied. The refractive index of the third lens at 587 nm is G3 and the refractive index of the fourth lens at 587 nm is G4, the relationship of $0.7 < G3/G4 < 1.2$ may be satisfied. The center thickness of the first lens is T1, the center thickness of the second lens is T2 and the center thickness of the third lens is T3, the relationships of $0.2 < T3/T2 < 1$ and $0.2 < T1/T3 < 1$ may be satisfied.

An optical system according to an embodiment of the invention includes a first lens, a second lens, a third lens, a fourth lens, a fifth lens, a sixth lens, a seventh lens, an eighth lens and a ninth lens which are sequentially arranged along an optical axis from an object side to an image side, wherein the first lens has positive or negative refractive power and has a convex object-side surface and a concave image-side surface, and the third lens has positive refractive power and has an convex object-side surface and a convex image-side surface, the fourth lens has negative refractive power and has an concave image-side surface, the eighth lens has positive refractive power and has at least one of the object-side surface and the image-side surface having at least one has one inflection point, the ninth lens has negative refractive power and has an object-side surface and an image-side surface which have at least one inflection point, and the center thickness of the third lens is thicker than a center thickness of each of the first, second, third to sixth lenses, and the edge of the object-side surface of the eighth lens protrudes toward the first lens rather than the apex on the optical axis of the object-side surface of the eighth lens, and a straight line connecting the edges of the object-side surface of the eighth lens may be the same as a straight line orthogonal to the optical axis in the middle between the object-side surface and the image-side surface of the seventh lens, or may be located closer to the first lens.

According to an embodiment of the invention, a straight line connecting the edges of the object-side surface of the eighth lens may be located closer to the first lens than a straight line orthogonal to the optical axis at the apex of the object-side surface of the seventh lens.

According to an embodiment of the invention, an interval between the fourth lens and the fifth lens along an optical axis is greater than a first interval between the second lens and the third lens, and a second interval between the eighth lens and the ninth lens along the optical axis may be smaller than the first interval. The first interval and the second interval may be 0.7 mm or more. The center thickness of the third lens may be in the range of 2 to 4 times that of the center thickness of the fourth lens.

Advantageous Effects

The optical system according to the embodiment may correct aberration characteristics and implement a slim optical system. Accordingly, the optical system may be miniaturized and high quality and high resolution may be realized. The optical system according to the embodiment may block unnecessary light entering the optical system. Accordingly, it is possible to improve the performance of the optical system by reducing aberration.

DESCRIPTION OF DRAWINGS

FIG. 3 is a block diagram of an optical system according to a third embodiment of the invention.

FIG. 4 is a diagram illustrating the relationship between the edge side of the eighth lens and the seventh lens in the first to third embodiments of the invention.

FIG. 15 is a perspective view of a mobile terminal having an optical system according to an embodiment of the invention.

BEST MODE

Figure 1:
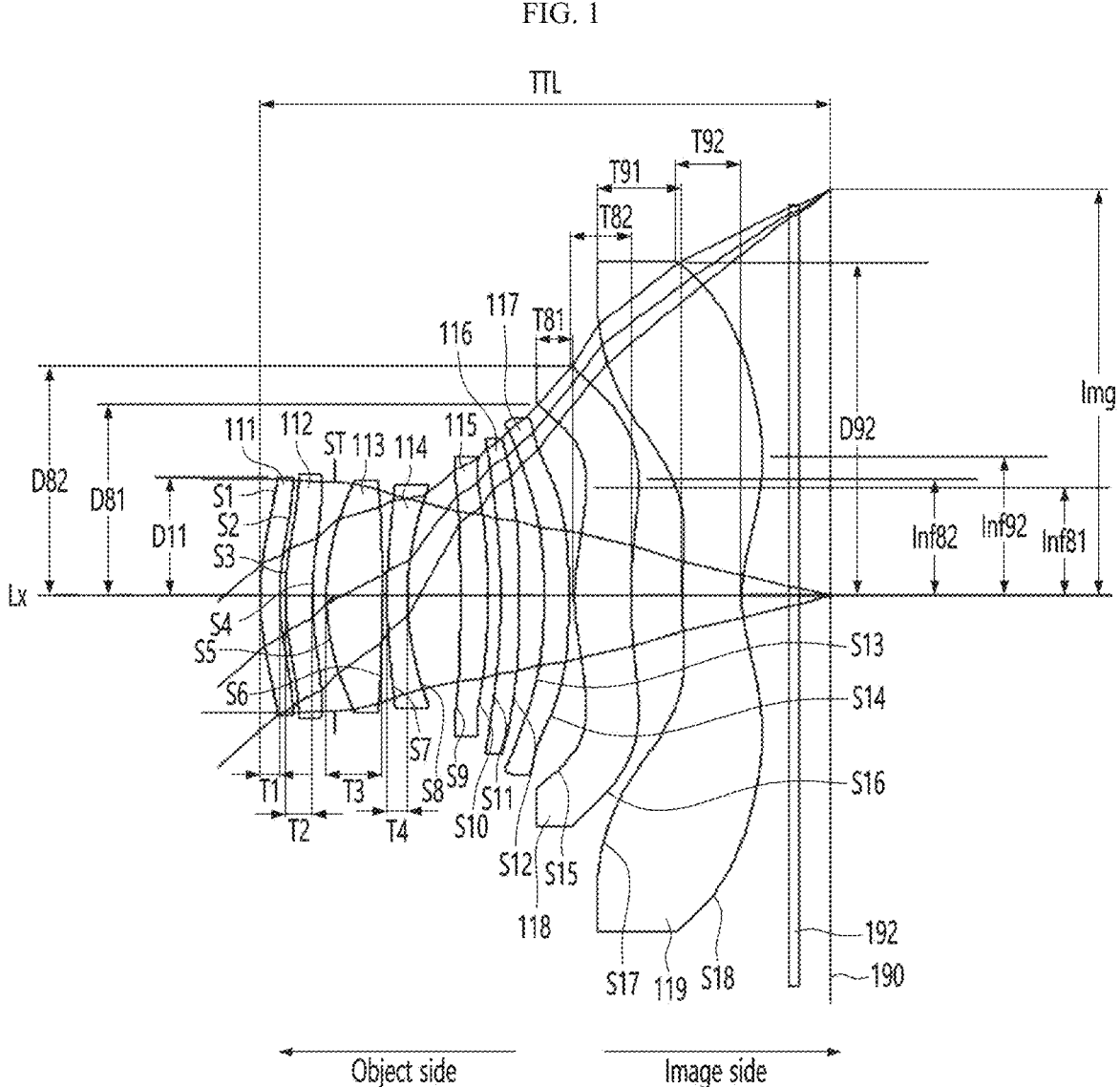
FIG. 1 is a block diagram of an optical system according to a first embodiment of the invention.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element. In the description of the invention, the first lens means the lens closest to the object side among the plurality of lenses aligned with the optical axis, and the last lens means the lens closest to the image side (or sensor side) among the plurality of lenses aligned with the optical axis. In the description of the invention, all measures for the radius, effective diameter, thickness, distance, BFL (Back Focal Length), TTL (Total Track Length or Total Top Length), etc. of the lens are mm unless otherwise specified. In the present specification, the shape of the lens is shown based on the optical axis of the lens. For example, that the object-side or sensor-side surface of the lens is convex means that the optical axis vicinity is convex on the object-side or sensor-side surface of the lens, but does not mean that the optical axis periphery is convex. Accordingly, even when the object-side or sensor-side surface of the lens is described as being convex, the portion around the optical axis on the object-side or sensor-side surface of the lens may be concave. That the object-side or sensor-side surface of the lens is concave means that the vicinity of the optical axis is concave on the object-side or sensor-side surface of the lens, but does not mean that the periphery of the optical axis is concave. Accordingly, even when the object-side or sensor-side surface of the lens is described as being concave, the portion around the optical axis on the object-side or sensor-side surface of the lens may be convex. In the present specification, it should be noted that the thickness and radius of curvature of the lens are measured based on the optical axis of the lens. In addition, "object-side surface" may mean the surface of the lens facing the object side with respect to the optical axis, and "image side" may mean the surface of the lens facing the imaging surface with respect to the optical axis.

An optical system according to an embodiment of the invention may include a plurality of lenses. In detail, the optical system according to the first to third embodiments may include at least nine lenses. As the resolution progresses, the size of the image sensor also increases, and the number of lenses gradually increases according to the resolution of the image sensor. An embodiment of the invention is to provide a high-resolution optical system using at least nine lenses.

Figure 2:
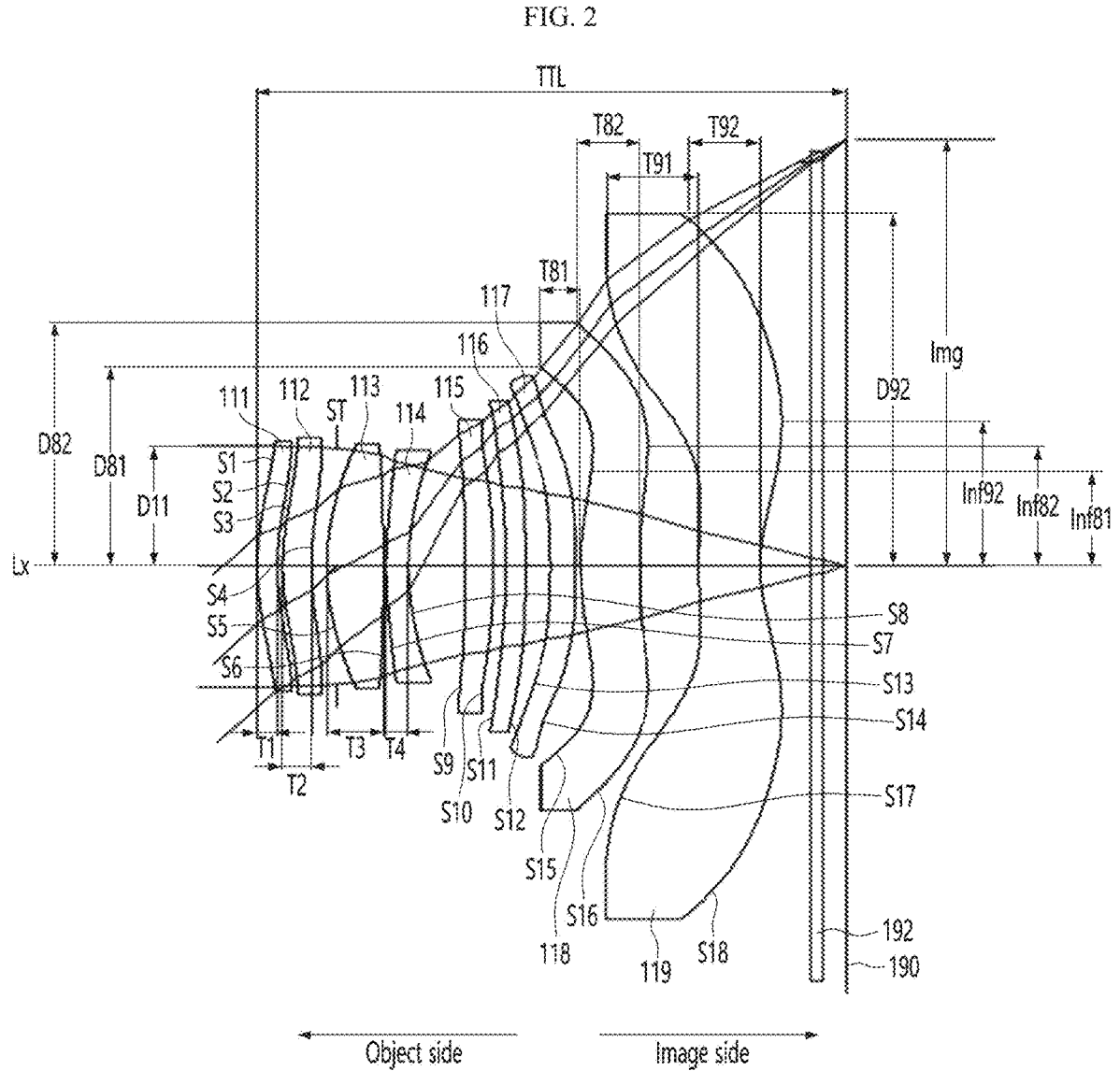
FIG. 2 is a block diagram of an optical system according to a second embodiment of the invention.
Figure 3:
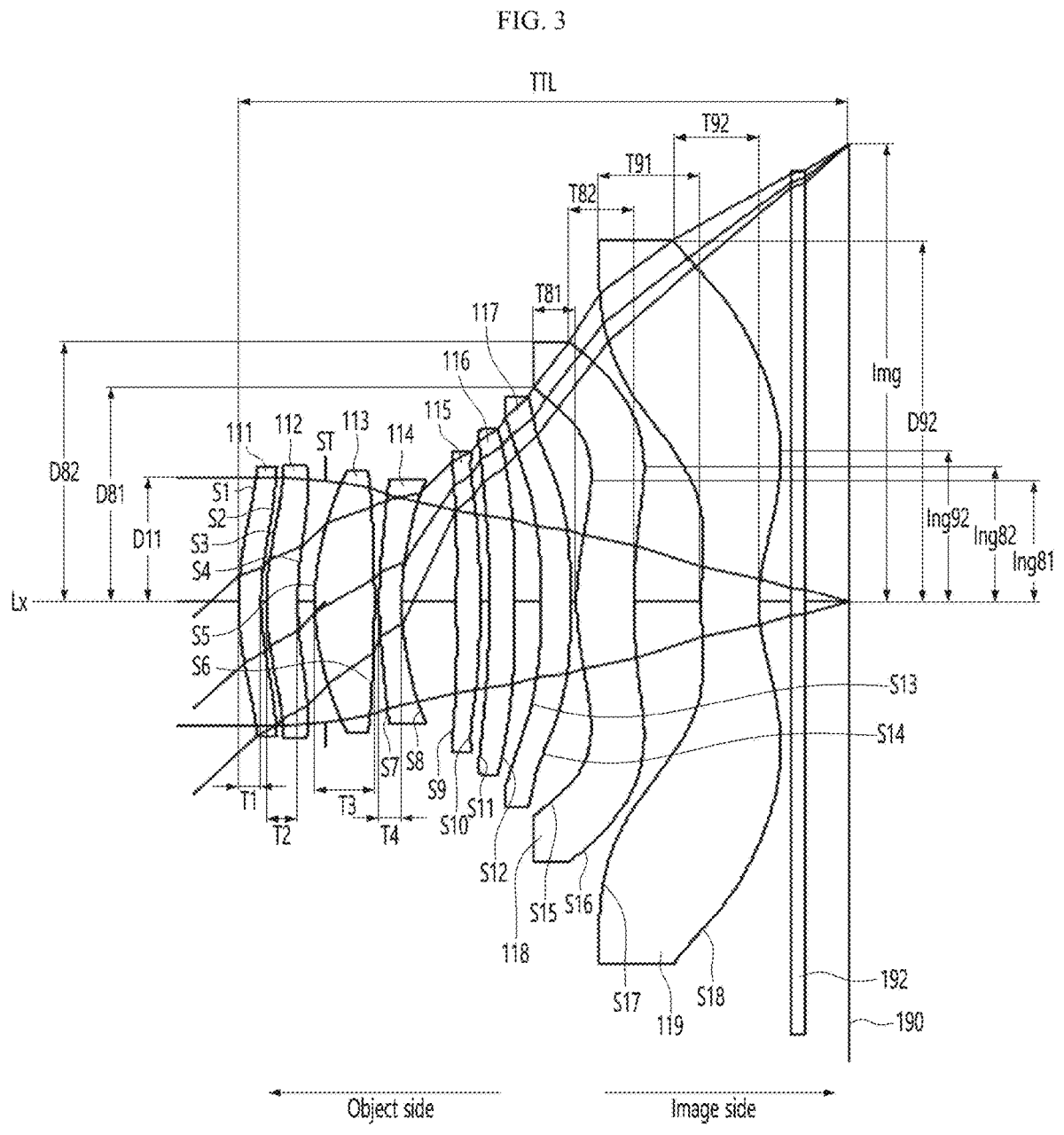

Referring to FIGS. 1 to 3, the optical systems of the first to third embodiments may include, for example, a first lens 111, a second lens 112, and a third lens 113, a fourth lens 114, a fifth lens 115, a sixth lens 116, a seventh lens 117, an eighth lens 118, and a ninth lens 119 which are sequentially arranged from the object side to the image side. The optical system may include an optical filter 192 and an image sensor 190. The optical system having the plurality of lenses 111-119 may be defined as a lens optical system, and the optical system further including the lenses 111-119, the optical filter 192 and the image sensor 190 may be defined as a camera module. The camera module may include a circuit board and at least one lens holder supporting one or two or more lenses, and may have one or plurality of drive member moving one or a plurality of lens holders in an optical axis direction and/or a direction perpendicular to the optical axis.

The first to ninth lenses 111, 112, 113, 114, 115, 116, 117, 118 and 119 may be sequentially disposed along the optical axis Lx of the optical system. The light corresponding to the image information of the object is incident through the first lens 111, the second lens 112, the third lens 113, the fourth lens 114, the fifth lens 115, and the sixth lens 116, the seventh lens 117, the eighth lens 118 and the ninth lens 119, pass through the optical filter 192 to focus on the image sensor 190, and obtain an electrical signal.

Each of the first to ninth lenses 111, 112, 113, 114, 115, 116, 117, 118 and 119 may include an effective region and an ineffective region. The effective region may be a region through which light incident on each lens passes. That is, the effective region may be a region in which incident light is refracted to realize optical properties. The ineffective region may be disposed around the effective region. The ineffective region may be a region to which the light is not incident. That is, the ineffective region may be a region independent of optical characteristics of the optical system. In addition, the ineffective region may be a region fixed to a barrel (not shown) for accommodating the lens, or a region in which light is blocked by a light blocking unit or a spacer.

At least one or two or more of the first to ninth lenses 111, 112, 113, 114, 115, 116, 117, 118, and 119, or at least one or two or more of the fifth to ninth lenses may have a length smaller than the effective diameter of the second direction in a first direction orthogonal to the optical axis Lx. Such lens(s) may be provided in a non-circular shape having a diameter in the second direction and a distance smaller than the diameter in the first direction.

The optical system according to FIGS. 1 to 3 may include an aperture stop ST for adjusting the amount of incident light. The stop ST may be disposed between two lenses selected from among the first to ninth lenses 111, 112, 113, 114, 115, 116, 117, 118 and 119. For example, the aperture stop ST may be disposed on an outer circumference between the second lens 112 and the third lens 113. The aperture stop ST may be disposed closer to the image side (or the exit surface) of the second lens 112 than the fourth lens 114.

As another example, at least one of the first to ninth lenses 111, 112, 113, 114, 115, 116, 117, 118 and 119 may serve as an aperture stop. For example, one selected from among the lens surfaces of the first to ninth lenses 111, 112, 113, 114, 115, 116, 117, 118 and 119 may serve as an aperture stop for controlling the amount of light. For example, the perimeter of the image-side surface of the second lens 112 or the perimeter of the object-side surface of the third lens 113 may serve as an aperture stop.

Referring to FIGS. 1 to 3, in the optical system, the first lens 111 may have positive (+) or negative (−) refractive power. The first lens 111 may include a plastic material. The first lens 111 may include a first surface S1 defined as an object-side surface and a second surface S2 defined as an image-side surface. The first surface S1 may be convex and the second surface S2 may be concave. That is, the first lens 111 may have a meniscus shape convex toward the object. At least one or both of the first surface S1 and the second surface S2 of the first lens 111 may be aspherical. At least one of the first surface S1 and the second surface S2 may have an inflection point.

The second lens 112 may have positive (+) or negative (−) refractive power. The second lens 112 may include a plastic or glass material. The second lens 112 may include a third surface S3 defined as an object-side surface and a fourth surface S4 defined as an image-side surface. The third surface S3 may be convex and the fourth surface S4 may be concave. That is, the second lens 112 may have a meniscus shape convex toward the object. At least one of the third surface S3 and the fourth surface S4 may be a spherical surface or an aspherical surface. For example, both the third surface S3 and the fourth surface S4 may be aspherical. The size of the effective diameters of the third surface S3 and the fourth surface S4 of the first lens 111 may be larger than the size of the effective diameters of the object-side surface or the image-side surface of the first lens 111, the second lens 112 or the third lens 113. Here, the effective diameter may be the diameter of the effective region of the image side or the object side on which light is incident. Here, the center thickness of the second lens 112 may be thicker than the center thickness of the first lens 111.

The third lens 113 may have positive (+) refractive power. The third lens 113 may include a plastic or glass material. The third lens 113 may include a fifth surface S5 defined as an object-side surface and a sixth surface S6 defined as an image-side surface. The fifth surface S5 may be convex and the sixth surface S6 may be convex. That is, the third lens 113 may have a shape in which both surfaces are convex. As another example, the fifth surface S5 may be convex and the sixth surface S6 may be infinity or concave. At least one of the fifth surface S5 and the sixth surface S6 may be a spherical surface or an aspherical surface. For example, both the fifth surface S5 and the sixth surface S6 may be aspherical. The size of the effective diameter of the object-side surface or the image-side surface of the third lens 113 may be greater than the size of the effective diameter of the object-side surface or the image-side surface of the fourth lens 114. Here, the center thickness of the third lens 113 may be in the range of 2 to 4 times the center thickness of each of the first, second, and fourth lenses 111, 112, and 114, and may be 1 mm or more.

The fourth lens 114 may have negative (−) refractive power. The fourth lens 114 may include a plastic or glass material. The fourth lens 114 may include a seventh surface S7 defined as an object-side surface and an eighth surface S8 defined as an image-side surface. The seventh surface S7 may be convex and the eighth surface S8 may be concave. That is, the fourth lens 114 may have a meniscus shape convex toward the object. As another example, the seventh surface S7 may be flat or concave. At least one of the seventh surface S7 and the eighth surface S8 may be a spherical surface or an aspherical surface. For example, both the seventh surface S7 and the eighth surface S8 may be aspherical.

The fifth lens 115 may have positive (+) or negative (−) refractive power. The fifth lens 115 may include a plastic or glass material. The fifth lens 115 may include a ninth surface S9 defined as an object-side surface and a tenth surface S10 defined as an image-side surface. The ninth surface S9 may be concave and the tenth surface S10 may be convex. That is, the fifth lens 115 may have a meniscus shape convex toward the image. Alternatively, the ninth surface S9 may be flat. At least one or both of the ninth surface S9 and the tenth surface S10 may be aspherical.

The sixth lens 116 may have positive (+) or negative (−) refractive power. The sixth lens 116 may include a plastic or glass material. The sixth lens 116 may include an eleventh surface S11 defined as an object-side surface and a twelfth surface S12 defined as an image-side surface. The eleventh surface S11 may be concave, and the twelfth surface S12 may be convex. That is, the sixth lens 116 may have a meniscus shape convex toward the image. Alternatively, the eleventh surface S11 may be flat. At least one or both of the eleventh surface S11 and the twelfth surface S12 may be aspherical. At least one of the eleventh surface S11 and the twelfth surface S12 may have an inflection point. A radius of curvature at the center of the eleventh surface S11 of the sixth lens 116 may be greater than a radius of curvature at the center of the thirteenth surface S13 of the seventh lens 117. Here, the effective diameter of the object-side surface S9 or the image-side surface S10 of the fifth lens 115 may be larger than the effective diameter of the object-side surface S7 or the image-side surface S8 of the fourth lens 114, may be smaller than the effective diameter of the object-side surface S11 or the image-side surface S12 of the sixth lens 116.

The seventh lens 117 may have positive (+) or negative (−) refractive power. The seventh lens 117 may include a plastic or glass material. The seventh lens 117 may include a thirteenth surface S13 defined as an object-side surface and a fourteenth surface S14 defined as an image-side surface. The thirteenth surface S13 may be concave and the fourteenth surface S14 may be convex. That is, the seventh lens 117 may have a meniscus shape convex toward the image. At least one or both of the thirteenth surface S13 and the fourteenth surface S14 may be aspherical. At least one of the thirteenth surface S13 and the fourteenth surface S14 may have an inflection point. A radius of curvature at the center of the thirteenth surface S13 of the seventh lens 117 may be smaller than a radius of curvature at the center of the object-side surfaces S5 and S7 of the third and fourth lenses 113 and 114. The radius of curvature at the center of the fourteenth surface S14 of the seventh lens 117 may be smaller than the radius of curvature at the center of the image-side surfaces S6 and S8 of the third and fourth lenses 113 and 114. Here, the effective diameter of the object-side surface S13 or the image-side surface S14 of the seventh lens 117 may be larger than the effective diameters of the object-side surface and the image-side surface of the first to sixth lenses 111, 112, 113, 114, 115 and 116, respectively.

The eighth lens 118 may have positive (+) refractive power. The eighth lens 118 may include a plastic material. The eighth lens 118 may include a fifteenth surface S15 defined as an object-side surface and a sixteenth surface S16 defined as an image-side surface. On the optical axis, the fifteenth surface S15 may be convex and the sixteenth surface S16 may be concave. The fifteenth surface S15 and the sixteenth surface S16 may be aspherical. At least one or both of the fifteenth surface S15 and the sixteenth surface S16 may have at least one inflection point. In detail, the fifteenth surface S15 may have an inflection point around the center, and the straight distance inf81 from the optical axis Lx to the inflection point may be disposed at a location that is between about 40% and about 60%, when the edge of the eighth lens 118 is used as an end point with respect to the optical axis Lx. Here, the straight distance inf82 from the fifteenth surface S15 to the inflection point may be a position set based on a direction orthogonal to the optical axis Lx. The position up to the inflection point of the sixteenth surface S16 may be disposed closer to the edge than the position up to the inflection point of the fifteenth surface 515. That is, the distance inf82>inf81 from the optical axis Lx to the inflection point may be satisfied, and the incident light may be refracted to the outside.

The ninth lens 119 may have negative (−) refractive power. The ninth lens 119 may include a plastic material. The ninth lens 119 may include a seventeenth surface S17 defined as an object-side surface and an 18th surface S18 defined as an image-side surface. On the optical axis, the seventeenth surface S17 may be convex and the eighteenth surface S18 may be concave. The seventeenth surface S17 and the eighteenth surface S18 may be aspherical. Each of the seventeenth surface S17 and the eighteenth surface S18 may have at least one inflection point. At least one or both of the seventeenth surface S17 and the eighteenth surface S18 may have an inflection point. In detail, the seventeenth surface S17 may have an inflection point around the center, and the inflection point may be disposed at a position of about 15% to about 50%, when the optical axis Lx is the starting point and the edge of the ninth lens 119 is the endpoint. Here, the position of the inflection point on the eighteenth surface S18 may be located at a straight distance inf92 based on a direction perpendicular to the optical axis Lx. The distance inf92 from the optical axis Lx to the inflection point of the eighteenth surface S18 may be greater than the distances inf81 and inf82 to the inflection point of the eighth lens 118, and may be disposed closer to the edge than of the inflection point position of the seventeenth surface S17.

Here, when the straight distance from the eighth lens 118 and the ninth lens 119 to the effective diameter with respect to the optical axis Lx is compared, the condition of D81<D82<D92 may be satisfied. D81 is the straight distance from the optical axis to the effective diameter of the fifteenth surface S15 of the eighth lens 118, D82 is the straight distance from the optical axis to the effective diameter of the sixteenth surface S16 of the eighth lens 118, D92 is the straight distance from the optical axis to the effective diameter of the eighteenth surface S18 of the ninth lens 119. Accordingly, the light incident from the eighth lens 118 may be refracted further outward with respect to the optical axis Lx. The straight distance D92 may be twice or more than the straight distance D11 from the optical axis to the effective diameter of the first surface S1 of the first lens 111, and may be in the range of 2 to 4 times. When the optical axis Lx distance from the eighth lens 118 and the ninth lens 119 to the effective diameter is compared, the condition of T81<T82<D92<D91 may be satisfied. T81 is the distance in the optical axis direction from the apex (optical axis position) of the fifteenth surface S15 of the eighth lens 118 to the effective diameter, and T82 is the distance in the optical axis direction from the apex (optical axis position) of the sixteenth surface S16 to the effective diameter, T91 is the distance in the optical axis direction from the apex (optical axis position) of the eighteenth surface S18 of the ninth lens 119, and T92 is the distance in the optical axis direction from the apex (optical axis position) of the eighteenth surface S18 to the effective diameter.

The optical filter 192 may include at least one of an infrared filter and an optical filter such as a cover glass. The optical filter 192 may pass light of a set wavelength band and filter light of a different wavelength band. When the optical filter 192 includes an infrared filter, radiant heat emitted from external light may be blocked from being transmitted to the image sensor. In addition, the optical filter 192 is disposed between the image sensor 190 and the ninth lens 119 and may transmit visible light and reflect infrared rays. The image sensor 190 may detect light. The image sensor 190 may include a charge coupled device (CCD) or a complementary metal oxide semiconductor (CMOS).

The total length (TTL) of the optical system may be provided in the range of 6.5 mm or more, for example, 6.5 mm to 11.5 mm or 7.6 mm to 10.5 mm. The TTL is the distance from the apex of the object-side surface of the first lens 111 to the image sensor 190. The distance BFL from the apex of the image-side eighteenth surface S18 of the ninth lens 119 to the image sensor 190 may be 1 mm or more, for example, in a range of 1 mm to 2 mm. The vertical distance Img from the optical axis of the image sensor 190 to 1.0 field may be 6 mm or more, for example, in a range of 6 mm to 10 mm or 6.5 mm to 9 mm. The total focal length F of the optical system may be in the range of 5 mm or more, for example, in a range of 5 mm to 10 mm or 6 mm to 9 mm.

In the optical system of the first to third embodiments, all of the first to eighteenth surfaces S1 to S18 of the first to ninth lenses 111, 112, 113, 114, 115, 116, 117, 118 and 119 may be aspherical. Each radius of curvature (changed to an absolute value) of the first to eighteenth surfaces S1-S18 about the optical axis may have the largest radius of curvature of the ninth surface S9, and may have the smallest radius of curvature of the eighteenth surface S18. Among the first to eighteenth surfaces S1-S18 of the first to ninth lenses 111, 112, 113, 114, 115, 116, 117, 118, 119, based on the optical axis Lx, the number of lenses with a convex object-side surface is four or more, the number of lenses with a concave object-side surface is four or more, the number of the lenses with a convex image-side surface is five or more, and the number of lenses with a concave image-side surface is four or more. Looking at the Abbe numbers of the first to ninth lenses 111, 112, 113, 114, 115, 116, 117, 118, and 119, the number of lenses having an Abbe number of 50 or more are six or more, and the number of lenses having an Abbe number of less than 50 may be three or less. For example, the Abbe numbers of the first lens 111, the second lens 112, the third lens 113, the fifth lens 115, the seventh lens 117, and the ninth lens 119 are 50 or more, the Abbe numbers of the fourth lens 114 and the sixth lens 116 may be 30 or less, and the Abbe numbers of the eighth lens 118 may be less than 35 and greater than 20. Looking at the refractive indices of the first to ninth lenses 111, 112, 113, 114, 115, 116, 117, 118, and 119, the number of lenses having a refractive index of 1.6 or more at 587 nm are three or more, and the number of lenses having a refractive index of less than 1.6 may be six or less. For example, at 587 nm, the fourth lens 114, the sixth lens 116, and the eighth lens 118 are 1.6 or more, and the first, second, and third lenses 111, 112, 113, the fifth lens 115, the seventh and ninth lenses 117 and 119 may be less than 1.6. The refractive index of the fourth lens 114 and the sixth lens 116 has the largest refractive index among the refractive indices of the lenses, and may be 1.65 or more.

Comparing at the thickness of the center of the first to ninth lenses 111, 112, 113, 114, 115, 116, 117, 118, and 119, the number of lenses having a center thickness of 0.6 mm or more is three or more, and the number of lenses having a thickness of less than 0.6 mm may be six or less. For example, the thicknesses T1, T2, and T3 of the centers of the first to third lenses 11, 112, and 113 may satisfy the condition of T1<T2<T3, and the thicknesses T4, T5, T6 of the centers of the fourth to sixth lenses 114, 115 and 116 may satisfy the condition of T6≤T1<T4<T5, the thickness of the center of the third and fourth lenses 113 and 114 satisfies the condition of T4<T3, and the center thicknesses T7, T8, and T9 of the seventh to ninth lenses 117, 118, and 119 may satisfy the condition of T3≤T7<T8≤T9. Here, T1 to T9 are the thicknesses of the respective centers of the first to ninth lenses 111-119.

The first to ninth lenses 111, 112, 113, 114, 115, 116, 117, 118, 119 may have three or more lenses having a center thickness of 1 mm or more, and being a third lens 113, an eighth lens 118, and a ninth lens 119. In the first to ninth lenses 111, 112, 113, 114, 115, 116, 117, 118, and 119, comparing at the interval on the optical axis between two adjacent lenses, the condition of T67≤T45<T89 is satisfied, T67 is the optical axis interval between the adjacent sixth and seventh lenses 116 and 117, and T45 is the optical axis interval between the fourth and fifth lenses 114 and 115, and T89 is the interval between the adjacent eighth and ninth lenses 118 and 119. Here, T45 is 0.8 mm or more, larger than the optical axis interval between the second and third lenses 112 and 113, T89 may be thicker than the center thickness of the second lens 112, greater than the sum of the center thicknesses of the first and sixth lenses 111 and 116, and may be 0.7 mm or more, for example, in the range of 0.7 mm to 1.2 mm. Also, in the interval between the eighth lens 118 and the ninth lens 119, the optical axis interval between two adjacent apexes on the optical axis may be greater than the interval between the two adjacent peripheral parts.

Figure 5:
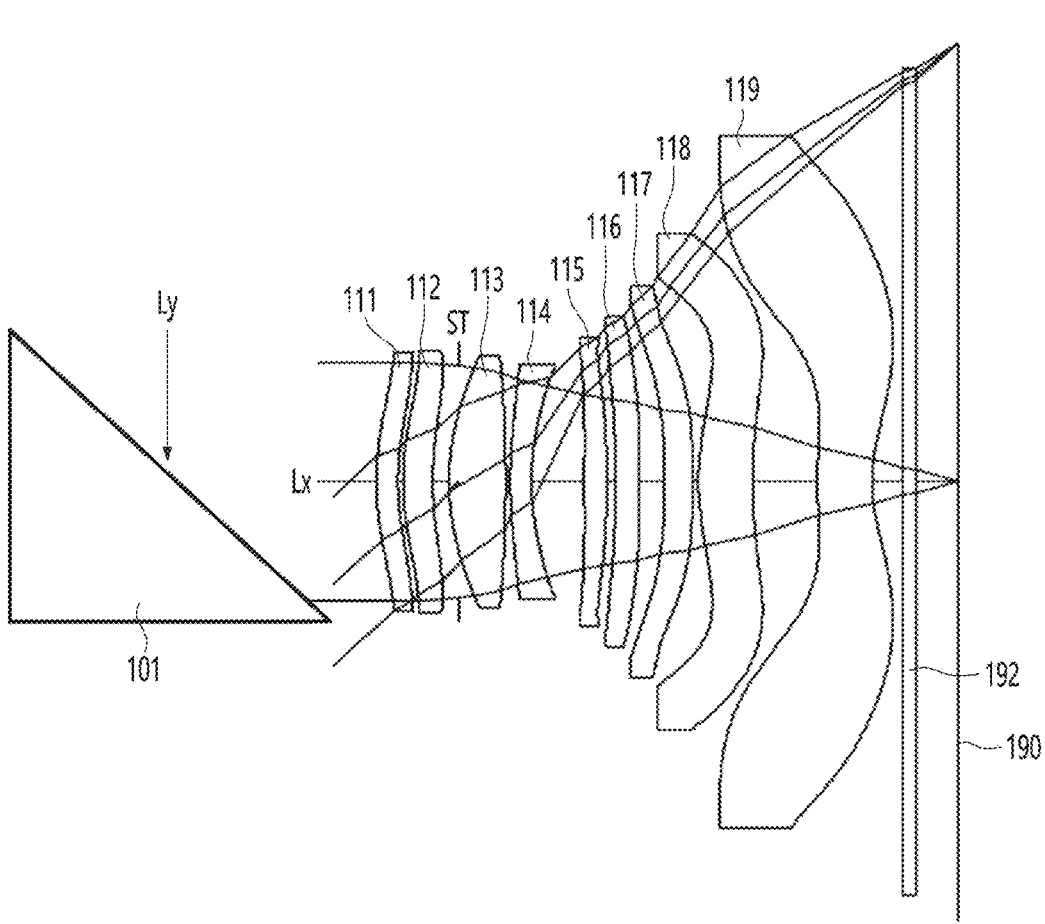
FIG. 5 is an example in which the reflective member is disposed on the incident side of the optical system according to the first to third embodiments of the invention.

As shown in FIG. 5, in the optical system, the reflective member 101 may be disposed on the incident side of the first lens 111. The reflective member 101 may reflect the light incident through the optical axis Ly orthogonal to the optical axis Lx of the first lens 111 to the ninth lens 119 to the first lens 111. The reflective member 101 may include a prism, that is, a triangular or right-angled prism.

Table 1 shows data showing the radius (mm) of curvature of the surface of each lens, the center thickness (mm) of each lens, the interval (mm) between two adjacent lenses, the refractive index, and the Abbe number of the first embodiment.

TABLE 1

| Lens | Surface | Radius | Thickness/ Interval | Index | Abbe # |
|------|---------|--------|---------|-------|--------|
| Lens 1 | S1 | 5.109 | 0.375 | 1.5441 | 56.115 |
| | S2 | 4.683 | 0.114 | | |
| Lens 2 | S3 | 5.028 | 0.530 | 1.5441 | 56.115 |
| | S4 | 5.933 | 0.453 | | |

TABLE 1-continued

| Lens | Surface | Radius | Thickness/ Interval | Index | Abbe # |
|------|---------|--------|---------|-------|--------|
| Aperture | Stop | Infinity | −0.176 | | |
| Lens 3 | S5 | 4.412 | 1.100 | 1.5441 | 56.115 |
| | S6 | −34.243 | 0.088 | | |
| Lens 4 | S7 | 8.771 | 0.401 | 1.6714 | 19.238 |
| | S8 | 4.762 | 1.048 | | |
| Lens 5 | S9 | −1345.830 | 0.541 | 1.5441 | 56.115 |
| | S10 | −15.529 | 0.256 | | |
| Lens 6 | S11 | −12.837 | 0.360 | 1.6714 | 19.238 |
| | S12 | −22.805 | 0.484 | | |
| Lens 7 | S13 | −11.935 | 0.484 | 1.5441 | 56.115 |
| | S14 | 38.092 | 0.115 | | |
| Lens 8 | S15 | 4.069 | 1.116 | 1.6142 | 25.592 |
| | S16 | 9.796 | 0.992 | | |
| Lens 9 | S17 | 7.208 | 1.179 | 1.5343 | 55.656 |
| | S18 | 2.981 | 0.923 | | |
| Optical filter | S19 | Infinity | 0.210 | 1.5168 | 64.198 |
| | S20 | Infinity | 0.608 | | |

In Table 1, the thickness is the center thickness (mm) of each lens, and the interval is the optical axis distance (mm) between two adjacent lenses. S19 denotes the incident side surface of the optical filter, and S20 denotes the exit surface of the optical filter. Table 2 shows values showing the aspheric coefficients of the surfaces of each lens of FIG. 1.

TABLE 2

| Surface | K | A | B | C | D |
|---------|---|---|---|---|---|
| S1 | −3.73631625 | −0.00349203 | −1.46E−05 | −0.00091096 | 0.000764164 |
| S2 | −21.9373411 | 0.017960042 | −0.01358408 | 0.002296169 | 0.001785936 |
| S3 | −4.82806387 | 0.000972049 | −0.00489612 | −0.00165178 | 0.003331635 |
| S4 | −27.2946133 | 0.01042508 | −0.01001746 | 0.003072705 | −6.58E−06 |
| S5 | −17.7223629 | 0.024913186 | −0.01157453 | 0.003828548 | −0.00052954 |
| S6 | 0 | 0.003897095 | −0.00376908 | 0.001525124 | −0.00021656 |
| S7 | 0 | −0.00794072 | −0.00197959 | 0.00243883 | −0.00116305 |
| S8 | −7.07456584 | −0.00264713 | 0.002115591 | −0.00165867 | 0.001462115 |
| S9 | 0 | −0.01088077 | 0.009814701 | −7.57E−03 | 0.003596104 |
| S10 | 0 | −0.01905597 | 0.022897942 | −0.01483811 | 0.005708634 |
| S11 | 0 | −0.00504494 | 0.009990015 | −0.00644325 | 0.002222412 |
| S12 | 0 | 0.006274881 | −0.00781405 | 0.003680245 | −0.00113935 |
| S13 | 8.881064865 | 0.010274068 | −0.0157695 | 0.007967405 | −0.00229339 |
| S14 | 0 | −0.04438022 | 0.014389246 | −0.00333367 | 0.000575485 |
| S15 | −12.6810085 | −0.02050428 | 0.010408361 | −0.00347344 | 0.000713713 |
| S16 | −3.82893572 | −0.00274562 | 0.000219047 | −0.00019987 | 3.56E−05 |
| S17 | −3.84290426 | −0.03141246 | 0.004398901 | −0.00062866 | 6.94E−05 |
| S18 | −5.59985148 | −0.01332077 | 0.001738185 | −0.00019266 | 1.51E−05 |

| Surface | E | F | G | H | J |
|---------|---|---|---|---|---|
| S1 | −0.00032464 | 7.96E−05 | −1.13E−05 | 8.73E−07 | −2.84E−08 |
| S2 | −0.00132741 | 0.000409292 | −6.80E−05 | 5.97E−06 | −2.18E−07 |
| S3 | −0.00178936 | 0.000505191 | −8.10E−05 | 6.99E−06 | −2.53E−07 |
| S4 | −0.00037176 | 0.000143965 | −2.66E−05 | 2.51E−06 | −9.75E−08 |
| S5 | −0.00016232 | 9.95E−05 | −2.18E−05 | 2.32E−06 | −9.83E−08 |
| S6 | −0.00010372 | 6.24E−05 | −1.43E−05 | 1.60E−06 | −7.08E−08 |
| S7 | 0.000366463 | −7.85E−05 | 1.09E−05 | −8.93E−07 | 3.25E−08 |
| S8 | −0.00077839 | 0.000249377 | −4.74E−05 | 4.93E−06 | −2.17E−07 |
| S9 | −0.00111216 | 2.26E−04 | −2.88E−05 | 2.09E−06 | −6.62E−08 |
| S10 | −0.00140959 | 0.00022767 | −2.32E−05 | 1.34E−06 | −3.38E−08 |
| S11 | −0.00046193 | 5.99E−05 | −4.73E−06 | 2.05E−07 | −3.68E−09 |
| S12 | 0.000246527 | −3.60E−05 | 3.35E−06 | −1.78E−07 | 4.10E−09 |
| S13 | 0.00040919 | −4.61E−05 | 3.22E−06 | −1.30E−07 | 2.31E−09 |

TABLE 2-continued

| | | | | | |
|---|---|---|---|---|---|
| S14 | −8.35E−05 | 9.73E−06 | −7.55E−07 | 3.25E−08 | −5.80E−10 |
| S15 | −9.91E−05 | 9.26E−06 | −5.54E−07 | 1.90E−08 | −2.82E−10 |
| S16 | −3.56E−06 | 2.30E−07 | −9.33E−09 | 2.12E−10 | −2.01E−12 |
| S17 | −4.82E−06 | 2.05E−07 | −5.24E−09 | 7.41E−11 | −4.47E−13 |
| S18 | −7.62E−07 | 2.43E−08 | −4.75E−10 | 5.19E−12 | −2.43E−14 |

Figure 6:
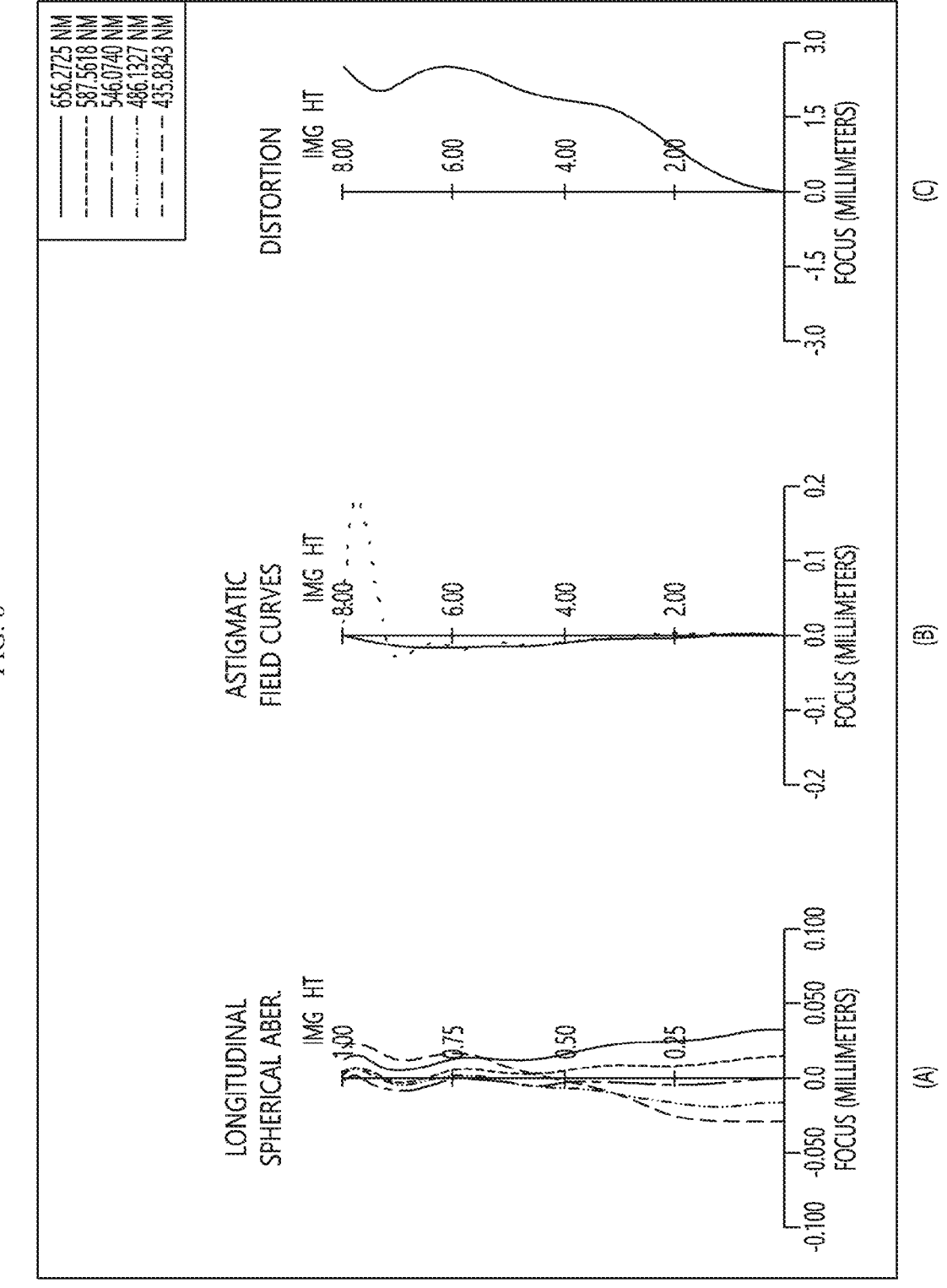
FIG. 6(A)(B)(C) are graphs showing longitudinal spherical aberration, astigmatic field curves, and distortion in the optical system of FIG. 1.

FIG. 6 is an analysis graph showing longitudinal spherical aberration, astigmatism, and distortion of the optical system of FIG. 1. By the optical system according to the first embodiment, spherical aberration as shown in FIG. 6(A) may be exhibited, and the spherical aberration may be a phenomenon in which the focusing positions of light passing through different parts (e.g., central part and peripheral part) of the lens are changed. The horizontal axis represents the degree of longitudinal spherical aberration, and the vertical axis represents the normalization of the distance from the center of the optical axis, and the change of the longitudinal spherical aberration according to the wavelength of light may be shown. The longitudinal spherical aberration may be exhibited, for example, for light with a wavelength of about 656.2725 nm, about 587.5618 nm, about 546.0740 nm, about 486.1327 nm, or about 435.8343 nm, respectively. Referring to FIG. 6(A), it can be seen that the longitudinal spherical aberration of the optical system is limited to within +0.025 to −0.025, showing stable optical properties. FIG. 6(B) is a graph showing astigmatism in the optical system according to the first embodiment. The astigmatism may be that when a tangential plane or a meridian plane and a sagittal plane of the lens have different radii, the focus of light passing through the vertical direction and the horizontal direction may be shifted from each other. Astigmatism of the optical system is a result obtained at a wavelength of about 546.0740 nm. The solid line indicates astigmatism (e.g., meridional curvature) in the tangential direction, and the dotted line indicates astigmatism (e.g., sagittal curve) in the sagittal direction. As may be seen from FIG. 6(B), it may be confirmed that the astigmatism is limited to within +0.050 to −0.050 or from +0.030 to −0.030 to show stable optical properties.

FIG. 6(C) is a graph illustrating distortion aberration according to the optical system of the first embodiment. Distortion aberration occurs because the optical magnification changes according to the distance from the optical axis (O-I). Compared to the image formed on the theoretical imaging plane, the image formed on the actual imaging plane (e.g., 190 in FIG. 1) may look larger or smaller. In FIG. 6(C), the distortion of the optical system is a result obtained at a wavelength of about 546.0740 nm, and the image captured through the optical system may be slightly distorted at a point deviating from the optical axis (O-I). However, such distortion is generally at a level that may be seen in an optical device using a lens, and the distortion rate is less than about 3%, so that good optical properties may be provided.

Figure 7:
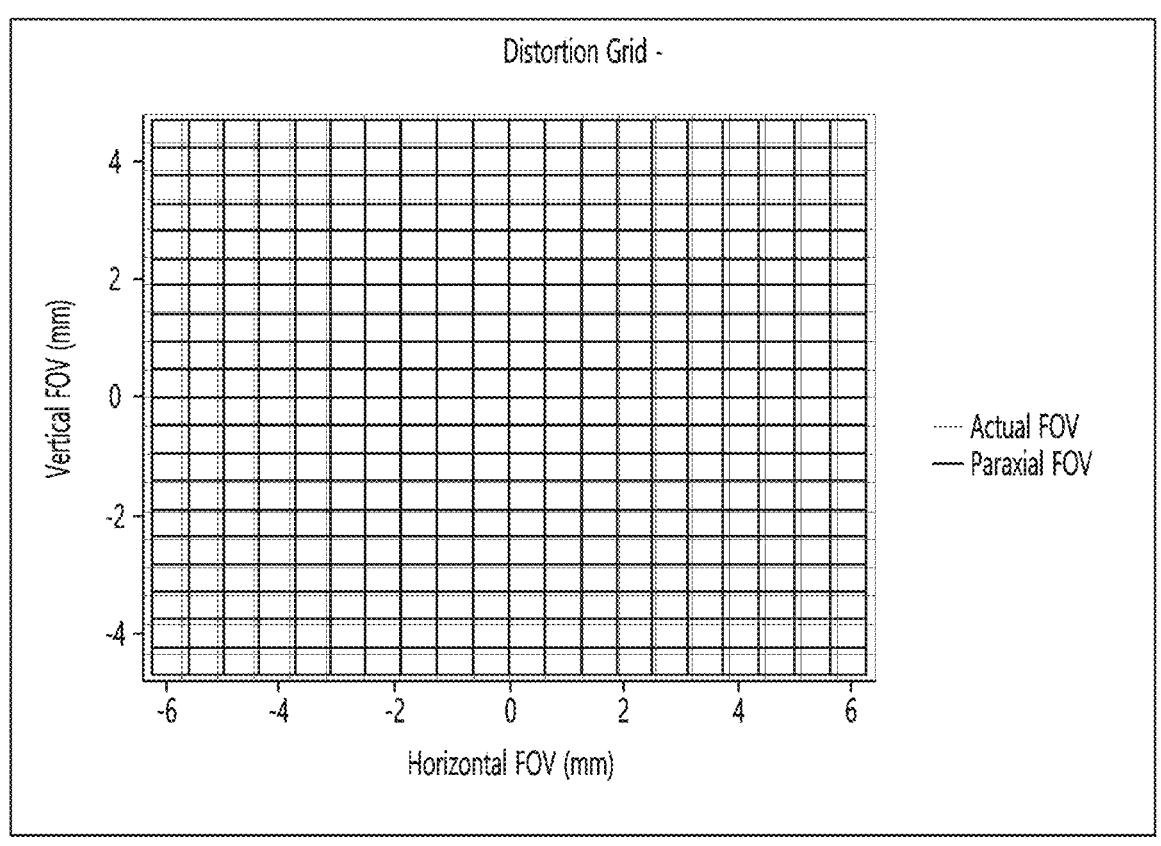
FIG. 7 is a diagram illustrating a distortion grid in the optical system of FIG. 1.
Figure 8:
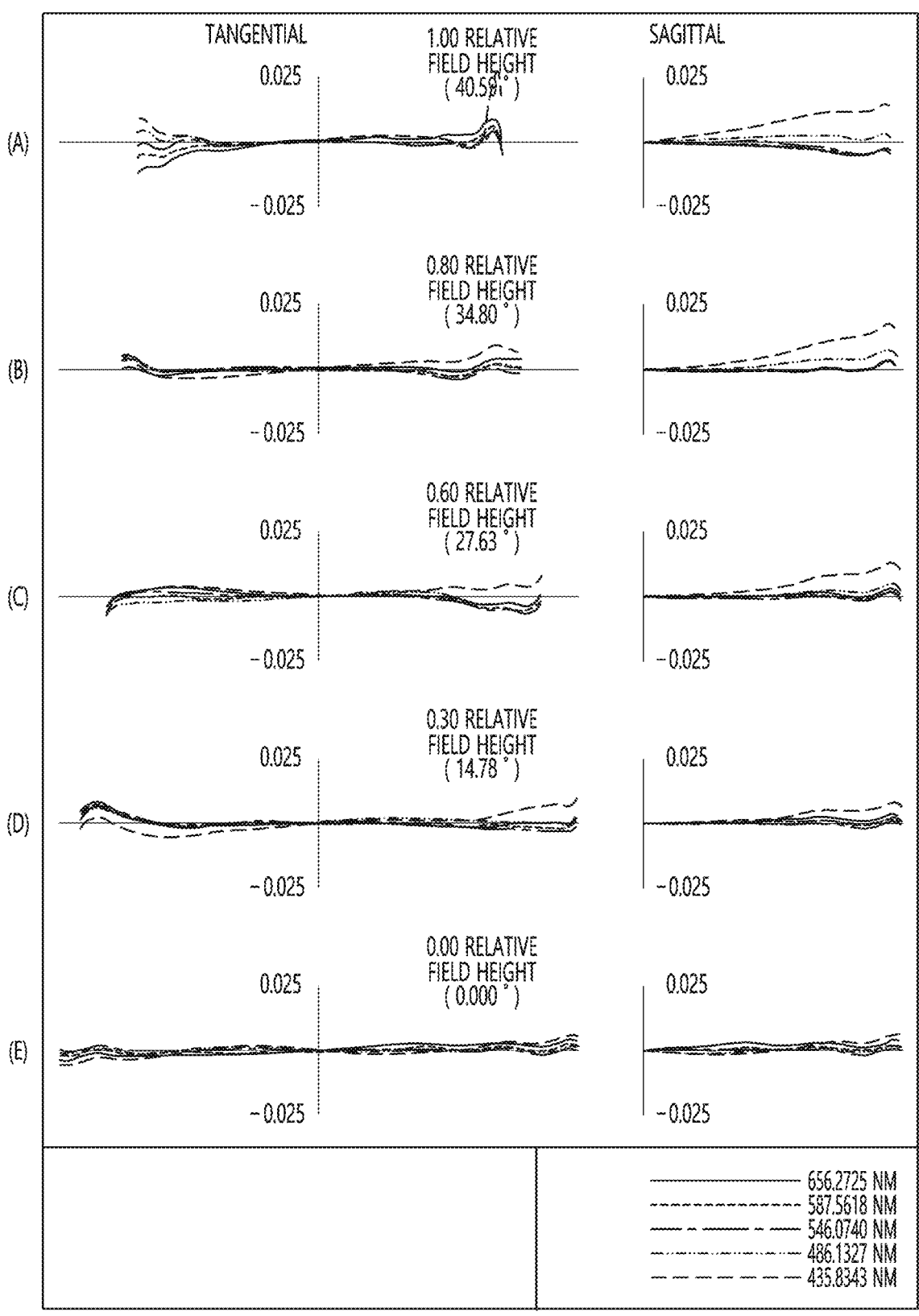
FIG. 8(A)-(E) are analysis graphs showing lateral aberration in the region where the relative field height on the optical axis is 0.0 to 1.0 in the tangential field curvature and the sagittal field curvature of the optical system of FIG. 1.

FIG. 7 is a distortion grid that occurs when light is emitted from the optical system according to the first embodiment. Here, it may be seen that distortion occurs in the left and right outer sides of the horizontal direction FOV (Field of View), and the distortion of the left and right outer regions may be greater than the distortion generated in upper and lower outer regions of the vertical direction FOV.

FIG. 8(A)-(E) is an analysis graph showing lateral aberration in a region where the relative field height on the optical axis is 0.0 to 1.0 on the tangential field curvature and the sagittal field curvature of the optical system shown in FIG. 1, and it may be confirmed that an optical system with good lateral aberration correction may be obtained.

A second embodiment will refer to FIG. 2. Table 3 below is data of the radius (mm) of curvature of the surface of each lens of the second embodiment, the center thickness (mm) of each lens, the interval (mm) between the adjacent two lenses, the refractive index, and the Abbe number shown in FIG. 2.

TABLE 3

| Lens | Surface | Radius | Thickness/ Interval | Index | Abbe # |
|---|---|---|---|---|---|
| Lens 1 | S1 | 5.097 | 0.371 | 1.5441 | 56.115 |
| | S2 | 4.681 | 0.102 | | |
| Lens 2 | S3 | 4.942 | 0.536 | 1.5441 | 56.115 |
| | S4 | 5.885 | 0.460 | | |
| Aperture | Stop | Infinity | −0.176 | | |
| Lens 3 | S5 | 4.447 | 1.056 | 1.5441 | 56.115 |
| | S6 | −40.453 | 0.050 | | |
| Lens 4 | S7 | 8.108 | 0.410 | 1.68061 | 18.453 |
| | S8 | 4.695 | 1.060 | | |
| Lens 5 | S9 | 321.194 | 0.533 | 1.5441 | 56.115 |
| | S10 | −16.241 | 0.237 | | |
| Lens 6 | S11 | −13.149 | 0.362 | 1.6714 | 19.238 |
| | S12 | −24.207 | 0.460 | | |
| Lens 7 | S13 | −12.231 | 0.463 | 1.5441 | 56.115 |
| | S14 | 64.492 | 0.094 | | |
| Lens 8 | S15 | 4.067 | 1.107 | 1.5843 | 28.227 |
| | S16 | 9.813 | 1.099 | | |
| Lens 9 | S17 | 7.776 | 1.155 | 1.5343 | 55.656 |
| | S18 | 2.977 | 0.951 | | |
| Optical filter | S19 | Infinity | 0.21 | 1.5168 | 64.198 |
| | S20 | Infinity | 0.459 | | |

In Table 3, the thickness is the thickness (mm) of the center of each lens of FIG. 2, and the interval is the distance (mm) between two adjacent lenses. S19 denotes the incident side surface of the optical filter, and S20 denotes the exit surface of the optical filter. Table 4 shows the values of the aspherical coefficients of the surfaces of each lens of FIG. 2.

TABLE 4

| Surface | K | A | B | C | D |
|---|---|---|---|---|---|
| S1 | −3.73929569 | −0.00324139 | −5.83E−05 | −0.00101695 | 0.000835432 |
| S2 | −21.9236266 | 0.018277834 | −0.01356274 | 0.001757179 | 0.002317528 |
| S3 | −4.81915361 | 0.000584374 | −0.00442877 | −0.00215866 | 0.003740432 |
| S4 | −27.6085424 | 0.009775604 | −0.00933304 | 0.002685253 | 0.000168239 |
| S5 | −17.7589185 | 0.024286312 | −0.01085488 | 0.003332238 | −0.00024693 |
| S6 | 0 | 0.005147401 | −0.00557401 | 0.00323821 | −0.00121981 |
| S7 | 0 | −0.00756163 | −0.0029935 | 0.003561486 | −0.00192525 |

TABLE 4-continued

| | | | | | |
|---|---|---|---|---|---|
| S8 | −7.06770972 | −0.00275629 | 0.002394002 | −0.00189499 | 0.001575236 |
| S9 | 0 | −0.01149469 | 0.010143262 | −0.00775818 | 0.00366823 |
| S10 | 0 | −0.02046338 | 0.024718521 | −0.01622401 | 0.00630992 |
| S11 | 0 | −0.00519751 | 0.011196214 | −0.00755807 | 0.00272382 |
| S12 | 0 | 0.006462071 | −0.00819803 | 0.003777172 | −0.00111746 |
| S13 | 8.954524623 | 0.012664422 | −0.01880493 | 0.009380201 | −0.00263113 |
| S14 | 0 | −0.03840225 | 0.010626537 | −0.00183209 | 0.000201131 |
| S15 | −12.5444722 | −0.02067041 | 0.010629179 | −0.00359402 | 7.49E−04 |
| S16 | −4.26581531 | −0.00298234 | 0.0002452 | −0.00018101 | 2.90E−05 |
| S17 | −3.75547441 | −0.03236047 | 0.004520248 | −0.00064977 | 7.27E−05 |
| S18 | −5.80139299 | −0.01318734 | 0.001725156 | −0.00019078 | 1.47E−05 |

| Surface | E | F | G | H | J |
|---|---|---|---|---|---|
| S1 | −0.00034691 | 8.33E−05 | −1.16E−05 | 8.69E−07 | −2.73E−08 |
| S2 | −0.00158639 | 0.000482415 | −8.02E−05 | 7.06E−06 | −2.59E−07 |
| S3 | −0.00198526 | 0.000560921 | −9.04E−05 | 7.84E−06 | −2.86E−07 |
| S4 | −0.00043554 | 0.000160189 | −2.92E−05 | 2.75E−06 | −1.07E−07 |
| S5 | −0.00028676 | 0.000137128 | −2.89E−05 | 3.06E−06 | −1.32E−07 |
| S6 | 0.000267597 | −2.43E−05 | −2.03E−06 | 6.30E−07 | −3.90E−08 |
| S7 | 0.000695928 | −0.0001694 | 2.65E−05 | −2.39E−06 | 9.47E−08 |
| S8 | −0.00081938 | 0.000261298 | −4.98E−05 | 5.23E−06 | −2.32E−07 |
| S9 | −0.0011265 | 0.000226395 | −2.85E−05 | 2.05E−06 | −6.38E−08 |
| S10 | −0.00156679 | 0.000253171 | −2.57E−05 | 1.48E−06 | −3.72E−08 |
| S11 | −0.00059328 | 8.10E−05 | −6.75E−06 | 3.12E−07 | −6.04E−09 |
| S12 | 0.000230518 | −3.26E−05 | 2.99E−06 | −1.60E−07 | 3.77E−09 |
| S13 | 0.000452428 | −4.86E−05 | 3.22E−06 | −1.22E−07 | 2.03E−09 |
| S14 | −2.45E−05 | 3.86E−06 | −3.97E−07 | 2.03E−08 | −4.01E−10 |
| S15 | −1.06E−04 | 1.01E−05 | −6.23E−07 | 2.20E−08 | −3.38E−10 |
| S16 | −2.49E−06 | 1.31E−07 | −4.11E−09 | 6.78E−11 | −3.92E−13 |
| S17 | −5.12E−06 | 2.21E−07 | −5.71E−09 | 8.17E−11 | −4.99E−13 |
| S18 | −7.34E−07 | 2.33E−08 | −4.56E−10 | 5.03E−12 | −2.39E−14 |

Figure 9:
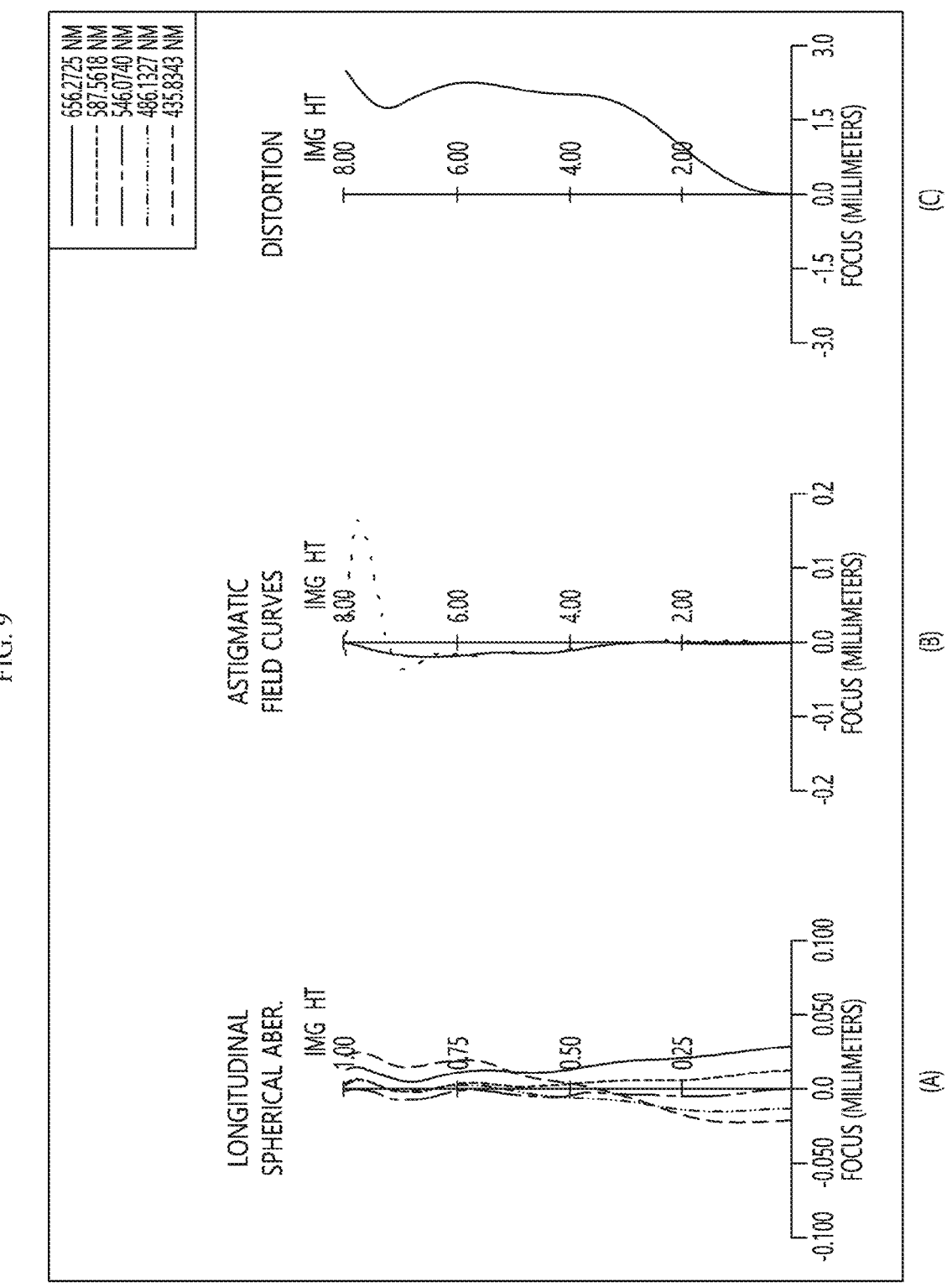
FIG. 9(A)(B)(C) are graphs showing longitudinal spherical aberration, astigmatic field curves, and distortion in the optical system of FIG. 2.

FIG. 9 is an analysis graph showing longitudinal spherical aberration, astigmatism, and distortion of the optical system of FIG. 2. By the optical system according to the second embodiment, spherical aberration as shown in FIG. 9(A) may be exhibited, and the spherical aberration may be a phenomenon in which the focusing positions of light passing through different parts (e.g., central part and peripheral part) of the lens are changed. The horizontal axis represents the degree of longitudinal spherical aberration, and the vertical axis represents the normalization of the distance from the center of the optical axis, and the change of the longitudinal spherical aberration according to the wavelength of light may be shown. The longitudinal spherical aberration may be exhibited, for example, for light with a wavelength of about 656.2725 nm, about 587.5618 nm, about 546.0740 nm, about 486.1327 nm, or about 435.8343 nm, respectively. Referring to FIG. 9(A), it may be seen that the longitudinal spherical aberration of the optical system is limited to within +0.025 to −0.025, showing stable optical properties. FIG. 9(B) is a graph showing astigmatism in the optical system according to the second embodiment. The astigmatism may be that when a tangential plane or a meridian plane and a sagittal plane of the lens have different radii, the focus of light passing through the vertical direction and the horizontal direction may be shifted from each other. Astigmatism of the optical system is a result obtained at a wavelength of about 546.0740 nm. The solid line indicates astigmatism (e.g., meridional curvature) in the tangential direction, and the dotted line indicates astigmatism (e.g., sagittal curve) in the sagittal direction. As may be seen from FIG. 9(B), it may be confirmed that the astigmatism is limited to within +0.050 to −0.050 or +0.030 to −0.030 to show stable optical properties. FIG. 9(C) is a graph illustrating distortion according to the optical system of the second embodiment. Distortion aberration occurs because the optical magnification changes according to the distance from the optical axis (O-I). Compared to the image formed on the theoretical imaging plane, the image formed on the actual imaging plane (e.g., 190 in FIG. 2) may look larger or smaller. In FIG. 9(C), the distortion of the optical system is a result obtained at a wavelength of about 546.0740 nm, and the image captured through the optical system may be slightly distorted at a point deviating from the optical axis (O-I). However, such distortion is generally at a level that may be seen in an optical device using a lens, and the distortion rate is less than about 3%, so that good optical properties may be provided.

Figure 10:
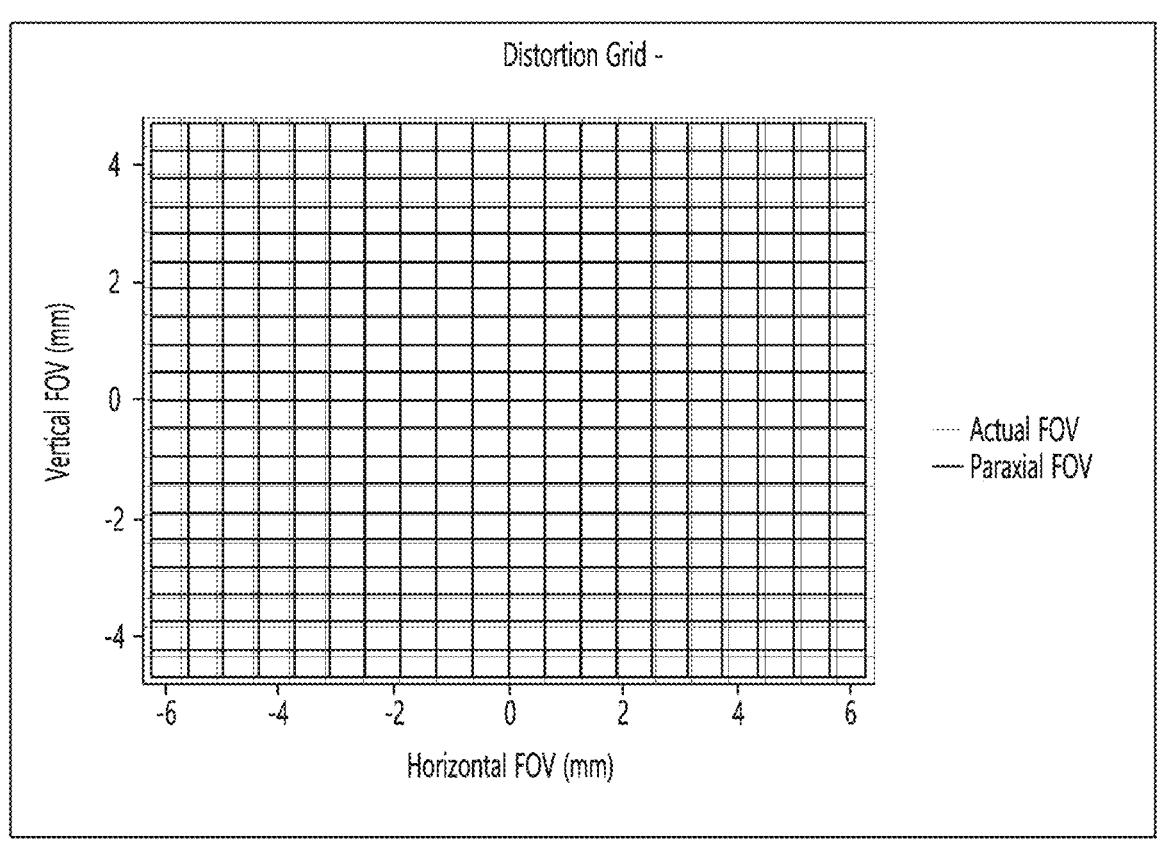
FIG. 10 is a diagram illustrating a distortion grid in the optical system of FIG. 2.
Figure 11:
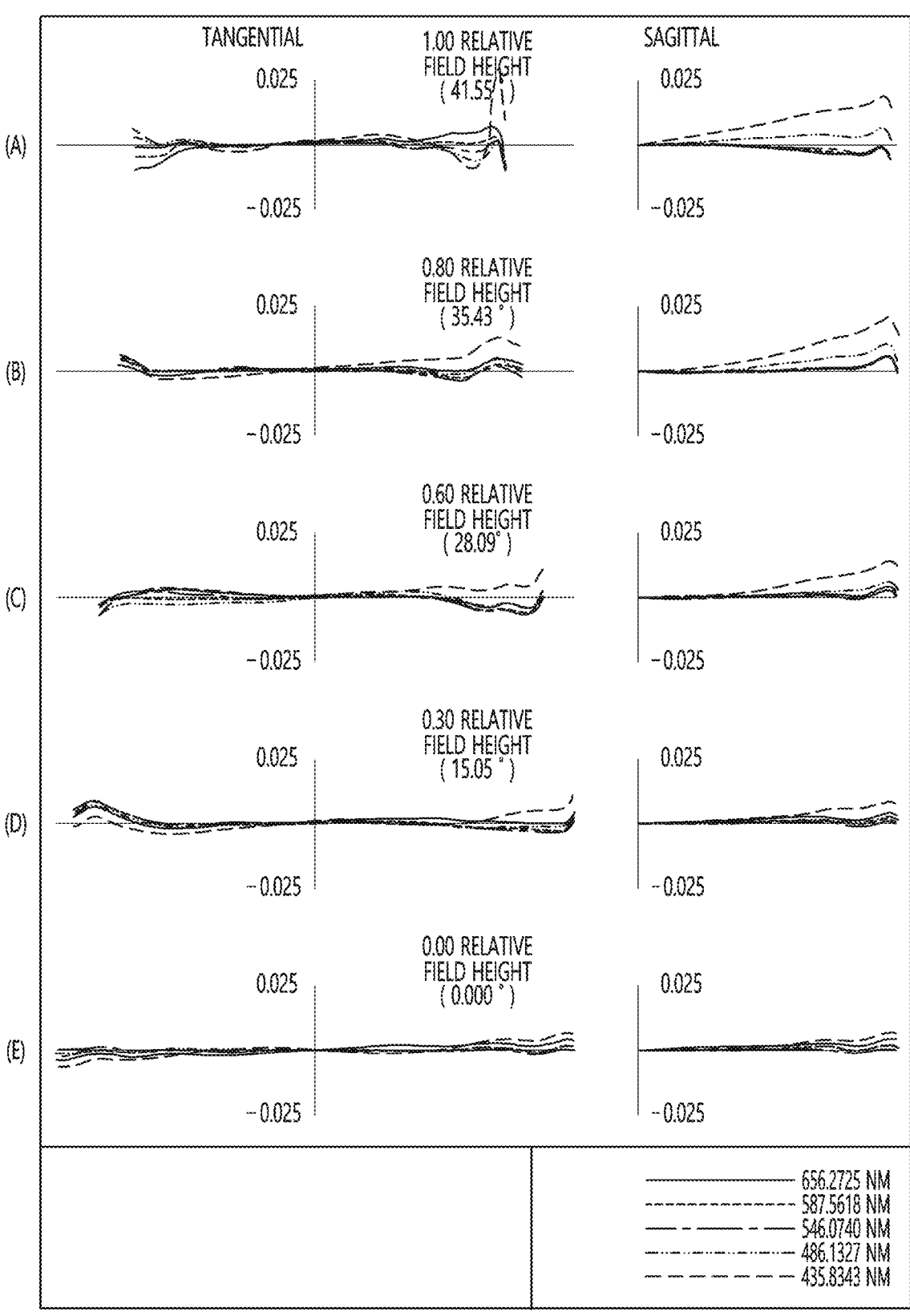
FIG. 11(A)-(E) are analysis graphs showing lateral aberration in the region where the relative field height on the optical axis is 0.0 to 1.0 in the tangential field curvature and the sagittal field curvature of the optical system of FIG. 2.

FIG. 10 is a distortion grid that occurs when light is emitted from the optical system according to the second embodiment. Here, it may be seen that distortion occurs in the left and right outer sides of the horizontal direction FOV (Field of View), and the distortion of the left and right outer regions may be greater than the distortion generated in upper and lower outer regions of the vertical direction FOV.

FIG. 111(A)-(E) is an analysis graph showing lateral aberration in a region where the relative field height on the optical axis is 0.0 to 1.0 on the tangential field curvature and the sagittal field curvature of the optical system shown in FIG. 2, and it may be confirmed that an optical system with good lateral aberration correction may be obtained.

The third embodiment refers to FIG. 3, and Table 5 shows the radius (mm) of curvature of the surface of each lens of the third embodiment, the center thickness (mm) of each lens, and the interval (mm) between two adjacent lenses, refractive index, and Abbe number shown in FIG. 3.

TABLE 5

| Lens | Surface | Radius | Thickness/Interval | Index | Abbe # |
|---|---|---|---|---|---|
| Lens 1 | S1 | 4.529 | 0.348 | 1.5343 | 55.656 |
| | S2 | 4.143 | 0.085 | | |

TABLE 5-continued

| Lens | Surface | Radius | Thickness/Interval | Index | Abbe # |
|------|---------|--------|--------------------|-------|--------|
| Lens 2 | S3 | 4.178 | 0.486 | 1.5343 | 55.656 |
|  | S4 | 5.274 | 0.424 |  |  |
| Aperture | Stop | Infinity | -0.158 |  |  |
| Lens 3 | S5 | 4.063 | 0.919 | 1.5343 | 55.656 |
|  | S6 | -26.381 | 0.079 |  |  |
| Lens 4 | S7 | 7.149 | 0.348 | 1.68061 | 18.453 |
|  | S8 | 4.037 | 0.861 |  |  |
| Lens 5 | S9 | 52.820 | 0.368 | 1.5343 | 55.656 |
|  | S10 | -18.587 | 0.146 |  |  |
| Lens 6 | S11 | -14.483 | 0.392 | 1.68061 | 18.453 |
|  | S12 | -25.428 | 0.405 |  |  |
| Lens 7 | S13 | -11.702 | 0.450 | 1.5343 | 55.656 |
|  | S14 | 45.773 | 0.101 |  |  |

TABLE 5-continued

| Lens | Surface | Radius | Thickness/Interval | Index | Abbe # |
|------|---------|--------|--------------------|-------|--------|
| Lens 8 | S15 | 3.463 | 0.885 | 1.5843 | 28.227 |
|  | S16 | 7.837 | 1.060 |  |  |
| Lens 9 | S17 | 6.621 | 0.893 | 1.5343 | 55.656 |
|  | S18 | 2.502 | 0.500 |  |  |
| Optical filter | S19 | Infinity | 0.210 | 1.5168 | 64.198 |
|  | S20 | Infinity | 0.698 |  |  |

In Table 5, the thickness is the thickness (mm) of the center of each lens of FIG. 3, and the interval is the distance (mm) between two adjacent lenses. S19 denotes the incident side surface of the optical filter, and S20 denotes the exit surface of the optical filter. Table 6 shows the values of the aspheric coefficients of the surfaces of each lens of FIG. 3.

TABLE 6

| Surface | K | A | B | C | D |
|---------|------|------|------|------|------|
| S1 | -3.84037338 | -0.00404189 | -0.00070798 | -0.00179986 | 0.002079053 |
| S2 | -22.053192 | 0.027449722 | -0.0290456 | 0.01031361 | 0.001942281 |
| S3 | -4.79282863 | 0.001375276 | -0.01063159 | -0.00057867 | 0.007447198 |
| S4 | -28.0957137 | 0.012966546 | -0.01441963 | 0.003106589 | 0.003248378 |
| S5 | -17.9329346 | 0.032079812 | -0.01638846 | 0.004643015 | 0.001697688 |
| S6 | 0 | 0.006176773 | -0.007137 | 0.004096941 | -0.00086847 |
| S7 | 0 | -0.01248608 | -0.00418107 | 0.00780412 | -0.00606703 |
| S8 | -7.08632658 | -0.00372859 | 0.00350981 | -0.0029762 | 0.003239139 |
| S9 | 0 | -0.01831639 | 0.017992967 | -0.01378606 | 0.005979581 |
| S10 | 0 | -0.02936705 | 0.042858328 | -0.03153932 | 0.012690771 |
| S11 | 0 | -0.0025544 | 0.010239141 | -0.00721586 | 0.001954908 |
| S12 | 0 | 1.20E-02 | -0.02172914 | 0.014821615 | -0.00614483 |
| S13 | 9.712201242 | 0.01697292 | -0.03125718 | 0.019503649 | -0.00673996 |
| S14 | 0 | -0.05377039 | 0.020010632 | -0.00519171 | 0.001020128 |
| S15 | -11.491129 | -0.02609134 | 0.016559213 | -0.00702728 | 1.82E-03 |
| S16 | -4.7133103 | -0.00390099 | 0.000735229 | -0.0005375 | 0.000103543 |
| S17 | -3.88291073 | -0.05274189 | 0.009982039 | -0.00186233 | 0.000266239 |
| S18 | -5.93718329 | -0.02064871 | 0.00351225 | -0.00050318 | 4.98E-05 |

| Surface | E | F | G | H | J |
|---------|------|------|------|------|------|
| S1 | -0.00115324 | 0.000366878 | -6.73E-05 | 6.65E-06 | -2.76E-07 |
| S2 | -0.00365768 | 0.001640285 | -0.00037032 | 4.30E-05 | -2.05E-06 |
| S3 | -0.00582187 | 0.00224488 | -0.00048238 | 5.52E-05 | -2.63E-06 |
| S4 | -0.00336351 | 0.001467758 | -3.50E-04 | 4.45E-05 | -2.36E-06 |
| S5 | -0.00250337 | 0.001212475 | -0.0003095 | 4.13E-05 | -2.27E-06 |
| S6 | -0.00061425 | 0.000542136 | -0.00017901 | 2.81E-05 | -1.74E-06 |
| S7 | 0.003029595 | -0.00097012 | 0.00019184 | -2.14E-05 | 1.04E-06 |
| S8 | -0.00223261 | 0.000936559 | -0.00023219 | 3.13E-05 | -1.76E-06 |
| S9 | -0.00145664 | 1.69E-04 | 1.21E-06 | -2.28E-06 | 1.55E-07 |
| S10 | -0.00290919 | 0.000355663 | -1.40E-05 | -1.32E-06 | 1.16E-07 |
| S11 | -3.23E-05 | -0.00010342 | 2.50E-05 | -2.52E-06 | 9.76E-08 |
| S12 | 0.001641367 | -0.00028152 | 3.00E-05 | -1.82E-06 | 4.82E-08 |
| S13 | 0.001390118 | -0.00017247 | 1.25E-05 | -4.78E-07 | 7.26E-09 |
| S14 | -0.00018816 | 3.02E-05 | -3.16E-06 | 1.78E-07 | -4.08E-09 |
| S15 | -3.19E-04 | 3.83E-05 | -3.00E-06 | 1.38E-07 | -2.77E-09 |
| S16 | -9.75E-06 | 4.15E-07 | 1.65E-09 | -7.71E-10 | 1.91E-11 |
| S17 | -2.40E-05 | 1.33E-06 | -4.40E-08 | 8.08E-10 | -6.34E-12 |
| S18 | -3.23E-06 | 1.35E-07 | -3.54E-09 | 5.30E-11 | -3.46E-13 |

Figure 12:
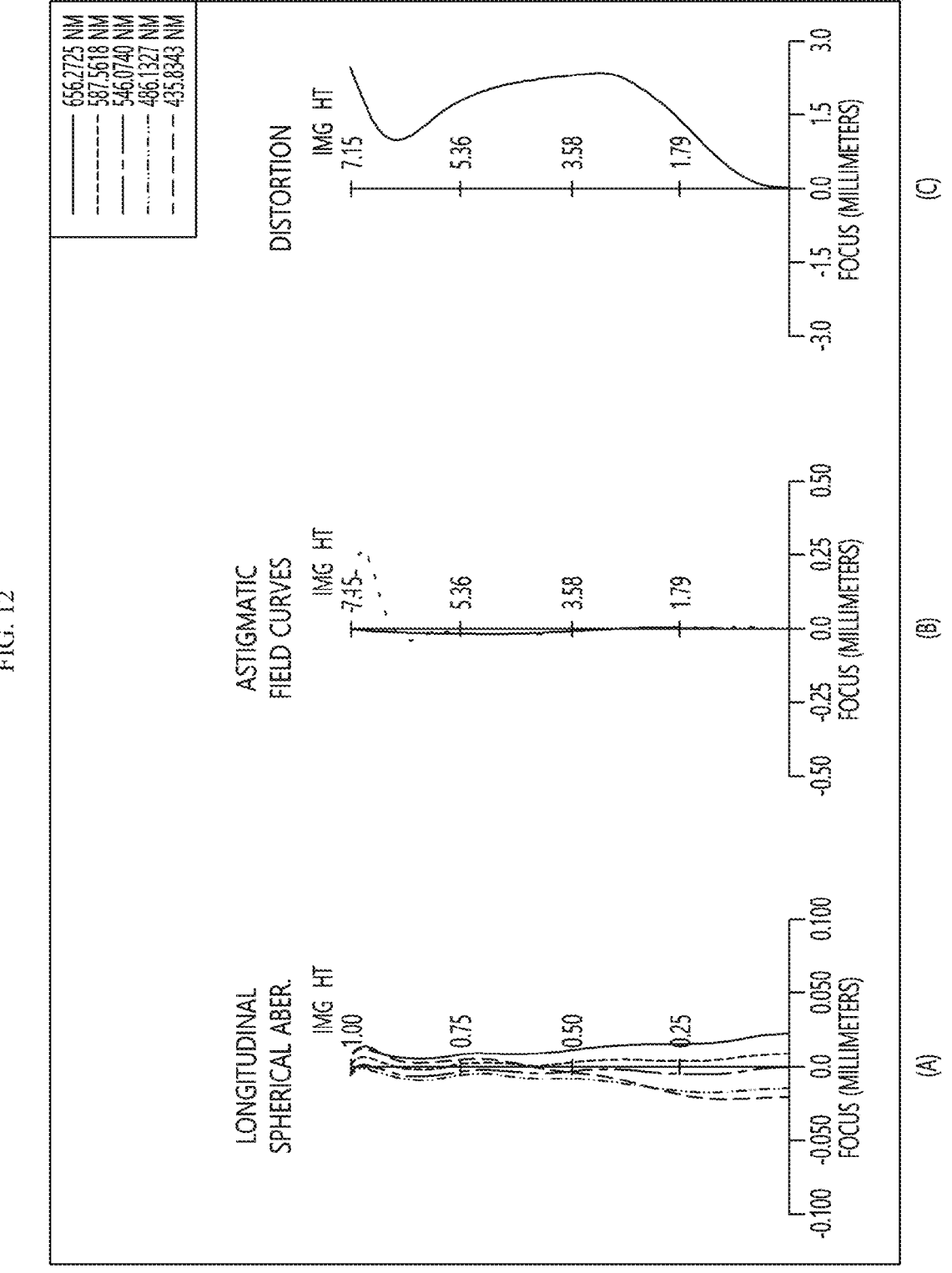
FIG. 12(A)(B)(C) are graphs showing longitudinal spherical aberration, astigmatic field curves, and distortion in the optical system of FIG. 3.

FIG. 12 is an analysis graph showing longitudinal spherical aberration, astigmatism, and distortion of the optical system of FIG. 3. By the optical system according to the third embodiment, spherical aberration as shown in FIG. 12(A) may be exhibited, and the spherical aberration may be a phenomenon in which the focusing positions of light passing through different parts (e.g., central part and peripheral part) of the lens are change. The horizontal axis represents the degree of longitudinal spherical aberration, and the vertical axis represents the normalization of the distance from the center of the optical axis, and the change of the longitudinal spherical aberration according to the wavelength of light may be shown. The longitudinal spherical aberration may be exhibited, for example, for light with a wavelength of about 656.2725 nm, about 587.5618 nm, about 546.0740 nm, about 486.1327 nm, or about 435.8343 nm, respectively. Referring to FIG. 12(A), it may be seen that the longitudinal spherical aberration of the optical system is limited to within +0.025 to −0.025, showing stable optical properties. FIG. 12(B) is a graph showing astigmatism in the optical system according to the third embodiment. The astigmatism may be that when a tangential plane or a meridian plane and a sagittal plane of the lens have different radii, the focus of light passing through the vertical direction and the horizontal direction may be shifted from each other. Astigmatism of the optical system is a result obtained at a wavelength of approximately 546.0740 nm. The solid line indicates astigmatism (e.g., meridional curvature) in the tangential direction, and the dotted line indicates astigmatism (e.g., sagittal curve) in the sagittal direction. As may be seen from FIG. 12(B), it may be confirmed that the astigmatism is limited to within +0.050 to −0.050 or +0.020 to −0.020 to show stable optical properties.

FIG. 12(C) is a graph showing distortion according to the optical system of the second embodiment. Distortion aberration occurs because the optical magnification changes according to the distance from the optical axis (O-I). Compared to the image formed on the theoretical imaging plane, the image formed on the actual imaging plane (e.g., 190 in FIG. 3) may look larger or smaller. In FIG. 12(C), the distortion of the optical system is a result obtained at a wavelength of about 546.0740 nm, and the image captured through the optical system may be slightly distorted at a point deviating from the optical axis (O-I). However, such distortion is generally at a level that can be seen in an optical device using a lens, and the distortion rate is less than about 3%, so that good optical properties may be provided.

Figure 13:
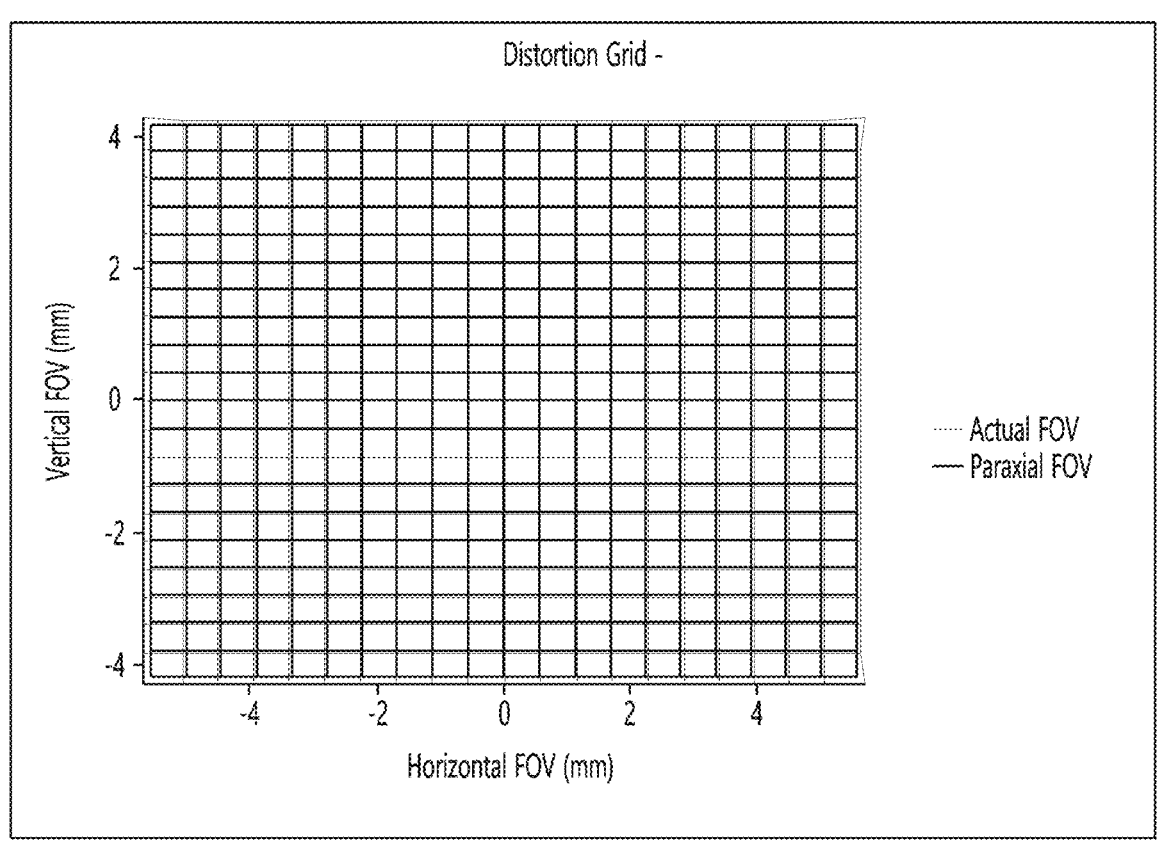
FIG. 13 is a diagram illustrating a distortion grid in the optical system of FIG. 3.
Figure 14:
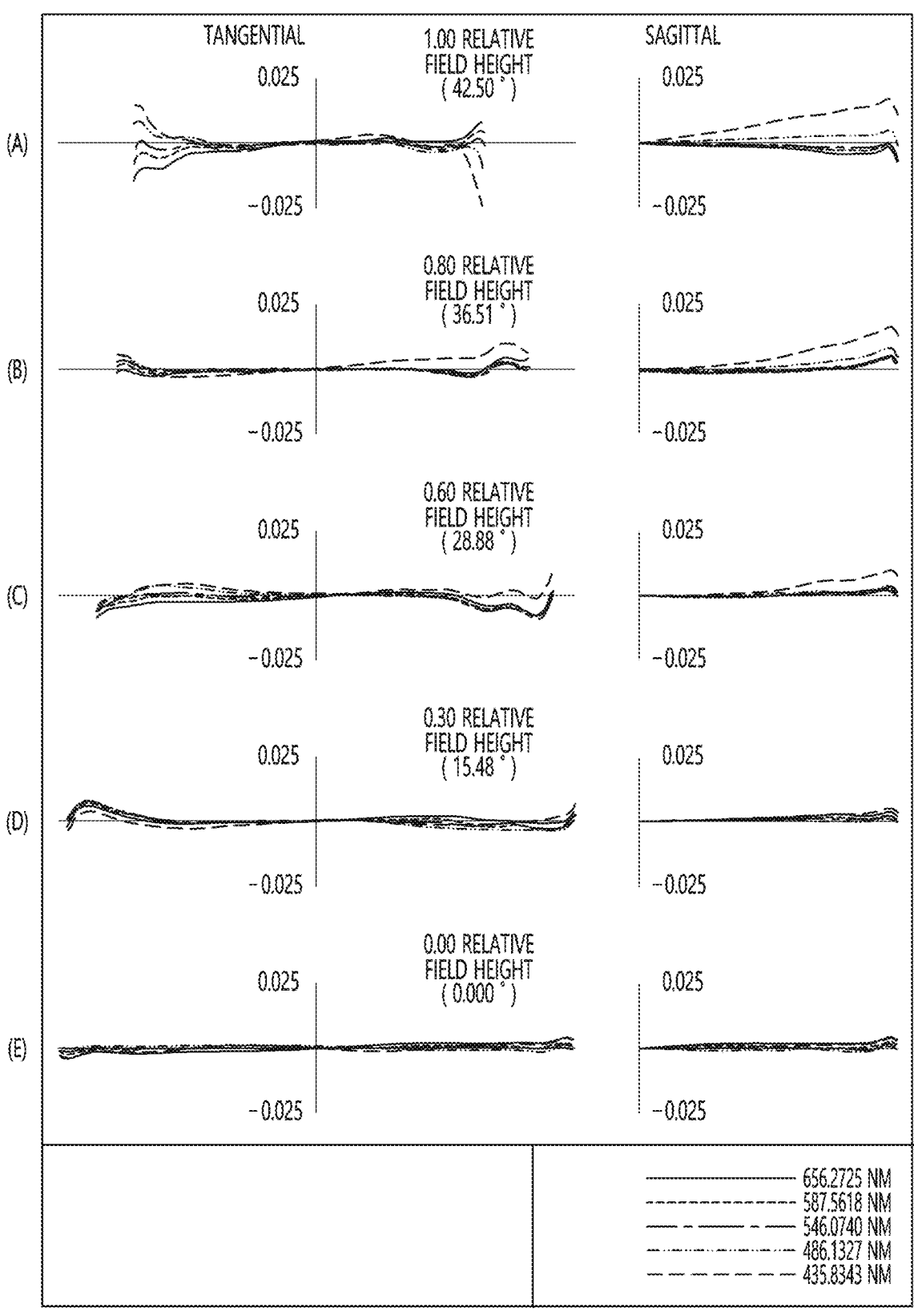
FIG. 14(A)-(E) are analysis graphs showing lateral aberration in the region where the relative field height on the optical axis is 0.0 to 1.0 in the tangential field curvature and the sagittal field curvature of the optical system of FIG. 3.

FIG. 13 is a distortion grid generated when light is emitted from the optical system according to the third embodiment. Here, it may be seen that distortion occurs in the left and right outer sides of the horizontal direction FOV (Field of View), and the distortion of the left and right outer regions may be greater than the distortion generated in upper and lower outer regions of the vertical direction FOV.

FIG. 14(A)-(E) is an analysis graph showing lateral aberration in a region where the relative field height on the optical axis is 0.0 to 1.0 on the tangential field curvature and the sagittal field curvature of the optical system shown in FIG. 3, and it may be confirmed that an optical system with good lateral aberration correction may be obtained.

As in the above first to third embodiments, it may be seen that each of the lenses 111-119 may be formed of a plastic lens, and all surfaces of each lens have aspheric coefficients.

In the first to third embodiments of the invention, the center thickness of the third, eighth, and ninth lenses 113, 118 and 119 is thicker than the center thickness of the other lenses, and may be, for example, 0.8 mm or more. The first interval between the fourth lens 114 and the fifth lens 115 and the second interval between the eighth lens 118 and the ninth lens 119 along the optical axis may be greater than an interval between the second lens 112 and the third lens 113 or an interval between the sixth lens 116 and the seventh lens 117, for example, 0.6 mm or more. A first interval between the fourth lens 114 and the fifth lens 115 along the optical axis may be greater than a second interval between the eighth lens 118 and the ninth lens 119.

In the embodiment of the invention, when nine or more lenses 111-119 are arranged along the optical axis Lx, in order to inhibit an increase in the total distance TTL of the optical system, lenses having a relatively large effective diameter, for example, the stacked structure the seventh, eighth, and ninth lenses 117, 118 and 119 may be made under the following conditions.

Figure 4:
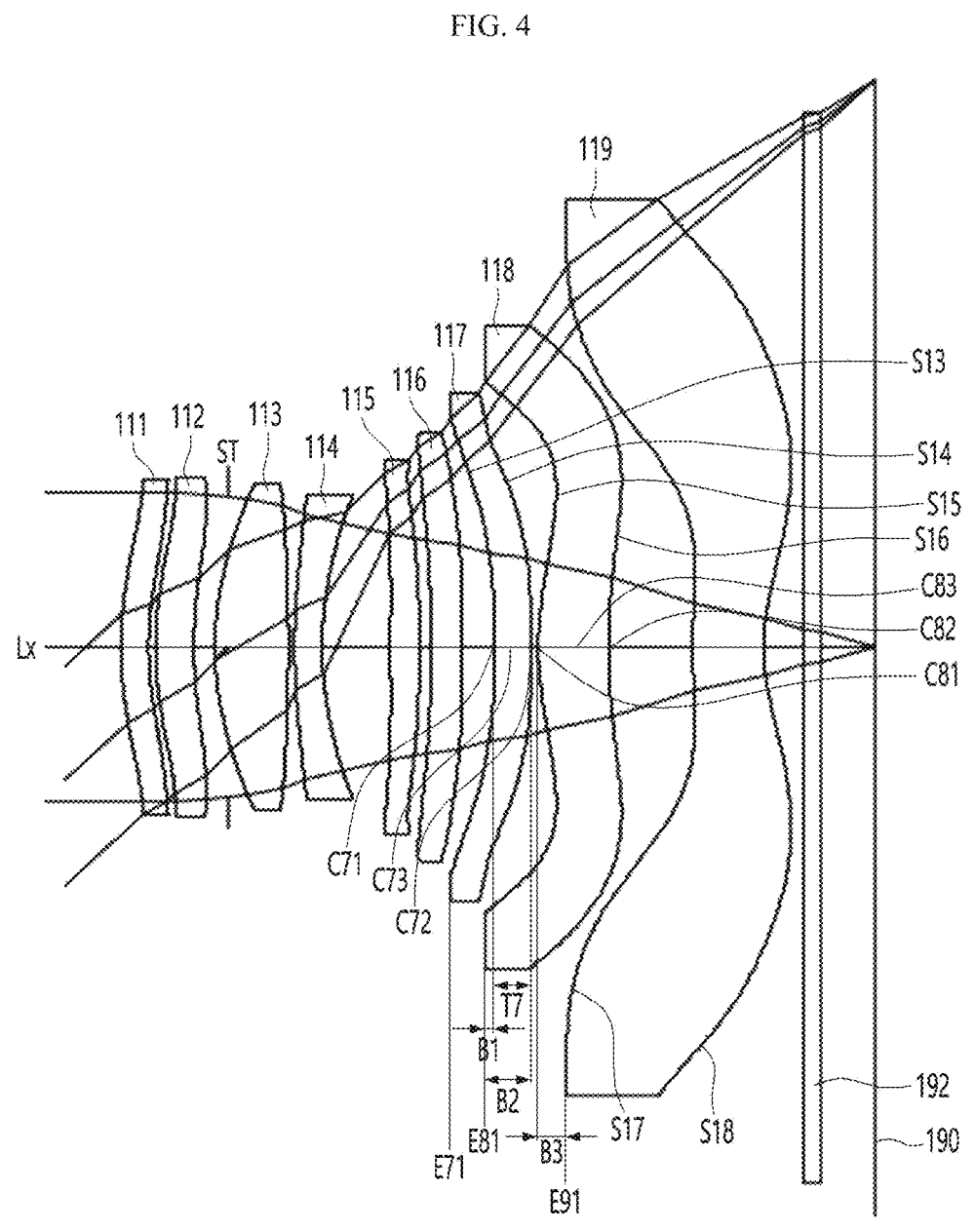

Referring to FIG. 4, when the difference in distance (optical axis direction) between the edge sides of two adjacent lenses among the seventh, eighth, and ninth lenses 117, 118, and 119 is compared, the condition of (E81-E71) <(E91-E81) may be satisfied. E71 is a straight line extending in a direction perpendicular to the optical axis Lx from the edge of the thirteenth surface S13 of the seventh lens 117 or a straight line connecting the edges of the object-side surface thereof, and E81 is a straight line extending in a direction perpendicular to the optical axis Lx from the fifteenth surface S15 of the eighth lens 118 or a straight line connecting the edges of the object-side surface thereof, E91 is a straight line extending in a direction perpendicular to the optical axis Lx from the seventeenth surface S17 of the ninth lens 119 or a straight line connecting the edges of the object-side surface thereof. Here, when looking at the distance in the optical axis direction, a straight line E81 extending in a direction orthogonal to the optical axis direction along the edge of the fifteenth surface S15 of the eighth lens 118 is located closer to the straight line E71 than the straight line (e.g., a straight line perpendicular to the optical axis) passing through the apex C72 of the fourteenth surface S14 of the seventh lens 117 or protrudes toward the first lens 111, and may be the same as a straight line passing through the middle C73 of both apexes C71 and C72 of the seventh lens 117, or may be located closer to the straight line E71 or the first lens 111.

Here, the straight line E81 passing through the object side edge of the eighth lens 118 has the first distance B1 from the straight line passing through the object-side apex C71 of the seventh lens 117 and has the second distance B2 from the straight line passing through the apex of the fourteenth image side S14 of the seventh lens 117, and a third distance B3 may be a distance between the edge-side straight line E91 of the image side seventeenth surface S17 of the ninth lens 119 and a straight line passing through the apex C81 of the eighth lens 118. A condition of the distance: B2<B3<B1 is satisfied, and B1 may be 1% or more of the thickness T7 of the seventh lens 117, for example, in a range of 1% to 50%. Accordingly, the outer upper portion of the eighth lens 118 is provided in a shape surrounding the object side of the seventh lens 117, and the incident-side fifteenth surface S15 of the eighth lens 118 may effectively receive the refracted light through the effective region of the fourth surface S14 on the emitting side of the seventh lens 117, thereby reducing light loss, and light may be provided up to the edge region of the image sensor 190 and the resolution deterioration may be inhibited.

The optical system according to the first to third embodiments of the invention may satisfy at least one or two or more of the following equations. Accordingly, the optical systems according to the first to third embodiments may have optically improved effects.

Table 7 may satisfy the following conditions in the optical systems of the first to third embodiments.

TABLE 7

| Item | First embodiment | Second embodiment | Third embodiment |
|---|---|---|---|
| BFL | 1.74 | 1.62 | 1.408 |
| TTL | 11.2 | 11 | 9.5 |
| Img | 8 | 8 | 7.15 |
| F | 8.987 | 8.807 | 7.615 |
| f39 | 10.245 | 10.262 | 9.713 |
| f13 | 7.03 | 7.119 | 6.161 |
| f14 | 10.538 | 10.408 | 9.168 |
| L3R1 | 4.412 | 4.447 | 4.063 |
| L3R2 | −34.243 | −40.453 | −26.381 |
| L4R1 | 8.771 | 8.108 | 7.149 |
| L4R2 | 4.762 | 4.695 | 4.037 |
| G3 | 1.5441 | 1.5441 | 1.5343 |
| G4 | 1.6714 | 1.68061 | 1.68061 |
| T1 | 0.375 | 0.371 | 0.348 |
| T2 | 0.53 | 0.536 | 0.486 |
| T3 | 1.099 | 1.056 | 0.919 |
| T4 | 0.401 | 0.41 | 0.348 |
| f1 | −149.377 | −153.713 | −132.72 |
| f2 | 49.962 | 46.985 | 32.442 |
| f3 | 7.225 | 7.393 | 6.631 |
| f4 | −15.979 | −17 | −14.099 |
| f5 | 28.742 | 28.303 | 25.669 |
| f6 | −43.861 | −42.931 | −49.548 |
| f7 | −16.572 | −18.772 | −17.321 |
| f8 | 10.447 | 11.003 | 9.794 |
| f9 | −10.496 | −9.817 | −8.107 |
| Inf81 | 2.2 | 2.186 | 1.978 |
| Inf82 | 2.252 | 2.254 | 2.1 |
| Inf92 | 2.734 | 2.706 | 2.284 |
| D11 | 2.35 | 2.35 | 2.1 |
| D81 | 3.799 | 3.742 | 3.346 |
| D82 | 4.545 | 4.566 | 4.068 |
| D92 | 6.6 | 6.6 | 5.65 |
| T81 | 0.741 | 0.738 | 0.655 |
| T82 | 1.17 | 1.154 | 1.001 |
| T91 | 1.63 | 1.708 | 1.577 |
| T92 | 1.258 | 1.371 | 1.337 |

In Table 7 above, F is the total focal length, f39 is the combined focal length from the third lens 113 to the ninth lens 119, and f13 is the combined focal length form the first lens 111 and the third lens 113, f14 is the combined focal length of the first lens 111 and the fourth lens 114, L3R1 is the radius of curvature of the object-side surface S5 of the third lens 113, and L3R2 is the radius of curvature of the image-side surface S6 of the third lens 113, L4R1 is the radius of curvature of the object-side surface S7 of the fourth lens 114, and L4R2 is the radius of curvature of the image-side surface S8 of the fourth lens 114, G3 is the refractive index of the third lens 113 at 587 nm, G4 is the refractive index of the fourth lens 114 at 587 nm, T1, T2, T3 are the center thickness of the first lens 111, the second lens 112 and the third lens 113, f1, f2, f3, f4, f5, f6, f7, f8, f9 is the focal length of each of the first to ninth lenses 111 to 119. From Table 7, through comparison with different values based on each numerical value, when the value has a difference of large, small, and 0.1 mm or less, it may be described as the same, large, or small. In addition to, in Table 7, inf81 is the straight distance from the optical axis to the inflection point of the object-side surface of the eighth lens 118, inf82 is the straight distance from the optical axis to the inflection point of the image-side surface of the eighth lens 118, D11 is the straight distance from the optical axis to the effective object-side diameter of the first lens 111, D81 is the straight distance from the optical axis to the object-side effective diameter of the eighth lens 118, and D82 is a straight distance from the optical axis to the image-side effective diameter of the eighth lens 118, and D92 is a straight distance from the optical axis to the image-side effective diameter of the ninth lens 119. In addition to, in Table 7, T81 is the optical axis distance from the apex of the object-side surface of the eighth lens 118 to the effective diameter, T82 is the optical-axis distance from the apex of the image-side surface of the eighth lens 118 to the effective diameter, and T91 is the optical axis distance from the apex of the object-side surface of the ninth lens 119 to the effective diameter, and T92 is the optical-axis distance from the apex of the image-side surface of the ninth lens 119 to the effective diameter.

Table 8 may be expressed by Equation 1 to Equation 29 by reflecting the characteristics of each lens of the optical system. The optical systems of the first to third embodiments may satisfy the range of at least one, two or more, or all of the following Equations 1 to 29.

TABLE 8

| Equation # | Range of Equation |
|---|---|
| eq 1. | $0 < BFL/TTL < 0.3$ |
| eq 2. | $0 < BFL/Img < 0.3$ |
| eq 3. | $0.5 < F/TTL < 1.2$ |
| eq 4. | $0.5 < TTL/(Img \times 2) < 0.8$ |
| eq 5. | $0.5 < TTL/(D92 \times 2) < 1.2$ |
| eq 6. | $0 < f3/F < 2$ |
| eq 7. | $-5 < f3/f4 < 0$ |
| eq 8. | $0 < f3/f39 < 2$ |
| eq 9. | $0.5 < f3/f13 < 5$ |
| eq 10. | $0.5 < f39/F < 5$ |
| eq 11. | $0.2 < f13/F < 5$ |
| eq 12. | $0 < f13/f14 < 2$ |
| eq 13. | $0 < f14/F < 5$ |
| eq 14. | $0 < L3R1/|L3R2| < 1$ |
| eq 15. | $0 < L4R2/|L4R1| < 1$ |
| eq 16. | $0.7 < G3/G4 < 1.2$ |
| eq 17. | $0.2 < T3/T4 < 1$ |
| eq 18. | $0.2 < T2/T3 < 1$ |
| eq 19. | $0.2 < T1/T3 < 1$ |

TABLE 8-continued

| Equation # | Range of Equation |
|---|---|
| eq 20. | $0.6 < Inf81/Inf82 < 1.2$ |
| eq 21. | $0.6 < Inf81/Inf92 < 1.2$ |
| eq 22. | $0.2 < Inf81/D81 < 0.8$ |
| eq 23. | $0.2 < Inf82/D82 < 0.8$ |
| eq 24. | $0.2 < Inf92/D92 < 0.8$ |
| eq 25. | $0.1 < T81/D81 < 0.5$ |
| eq 26. | $0.1 < T82/D82 < 0.5$ |
| eq 27. | $0.1 < T92/D92 < 0.5$ |
| eq 28. | $0.8 < T91/T92 < 1.5$ |
| eq 29. | $2 < D92/D11 < 5$ |

Table 9 may be expressed as detailed numerical ranges according to each equation in the optical systems of the first to third embodiments based on Table 8.

TABLE 9

| Equation # | Equation item | First embodiment | Second embodiment | Third embodiment |
|---|---|---|---|---|
| eq 1. | BFL/TTL | 0.155 | 0.147 | 0.148 |
| eq 2. | BFL/Img | 0.218 | 0.203 | 0.197 |
| eq 3. | F/TTL | 0.802 | 0.801 | 0.802 |
| eq 4. | $TTL/(Img \times 2)$ | 0.700 | 0.688 | 0.664 |
| eq 5. | $TTL/(D92 \times 2)$ | 0.848 | 0.833 | 0.841 |
| eq 6. | f3/F | 0.804 | 0.839 | 0.871 |
| eq 7. | f3/f4 | -0.452 | -0.434 | -0.470 |
| eq 8. | f3/f39 | 0.705 | 0.720 | 0.683 |
| eq 9. | f3/f13 | 1.027 | 1.039 | 1.076 |
| eq 10. | f39/F | 1.140 | 1.165 | 1.276 |
| eq 11. | f13/F | 0.782 | 0.808 | 0.809 |
| eq 12. | f13/f14 | 0.667 | 0.684 | 0.672 |
| eq 13. | f14/F | 1.173 | 1.182 | 1.204 |
| eq 14. | L3R1/|L3R2| | 0.129 | 0.110 | 0.154 |
| eq 15. | L4R2/|L4R1| | 0.543 | 0.579 | 0.565 |
| eq 16. | G3/G4 | 0.924 | 0.919 | 0.913 |
| eq 17. | T4/T3 | 0.365 | 0.388 | 0.379 |
| eq 18. | T2/T3 | 0.482 | 0.508 | 0.529 |
| eq 19. | T1/T3 | 0.341 | 0.351 | 0.379 |
| eq 20. | Inf81/Inf82 | 0.977 | 0.970 | 0.942 |
| eq 21. | Inf81/Inf92 | 0.805 | 0.808 | 0.866 |
| eq 22. | Inf81/D81 | 0.579 | 0.584 | 0.591 |
| eq 23. | Inf82/D82 | 0.495 | 0.494 | 0.516 |
| eq 24. | Inf92/D92 | 0.414 | 0.410 | 0.404 |
| eq 25. | T81/D81 | 0.195 | 0.197 | 0.196 |
| eq 26. | T82/D82 | 0.257 | 0.253 | 0.246 |
| eq 27. | T92/D92 | 0.191 | 0.208 | 0.237 |
| eq 28. | T91/T92 | 1.296 | 1.246 | 1.180 |
| eq 29. | D92/D11 | 2.809 | 2.809 | 2.690 |

The condition of $0<BFL/TTL<0.3$ in Equation 1 may provide a high-resolution optical system by providing TTL with a longer length compared to BFL. The condition of $0<BFL/Img<0.3$ in Equation 2 represents the relationship between the distance from the apex of the image-side eighteenth surface S18 of the ninth lens 119 to the image sensor 190 and the distance from the optical axis Lx to 1.0F, and it is possible to provide the image sensor 190 having a high resolution and a large size by satisfying the condition of (BFL×2)<Img.

The relationship between the total length of the optical system and the effective focal length was defined by $0.5<F/TTL<1.2$ in Equation 3.

According to Equation 4, $0.5<TTL/(Img×2)<0.8$, the total length TTL may be provided in the range of 50% to 80% of the diagonal length of the image sensor 190.

In Equation 14, |L3R2| represents the absolute value of the radius of curvature of the image-side surface S6 of the third lens 113 and may be greater than the radius of curvature L3R1 of the object side surface S5 of the third lens 113, In Equation 15, |L4R1| represents the absolute value of the radius of curvature of the object-side surface S7 of the fourth lens 114, and may be greater than the radius of curvature L4R2 of the image-side surface S8 of the fourth lens 114.

The optical performance may be improved by the thickness relationship of the centers of the first to fourth lenses 111, 112, 113, and 114 of Equations 17 to 19.

According to Equations 20 and 21, refractive power of the incident light may be improved through the relationships of the straight distance inf81 from the optical axis to the inflection point of the object-side surface S15 of the eighth lens 118, the straight distance inf82 from the eighth lens 118 to the inflection point of the image-side surface S16 of the eighth lens 118, and the straight distance inf92 to the inflection point of the image-side surface S18 of the ninth lens 119.

According to Equations 22 to 24, the straight distance D81 from the optical axis to the effective diameter of the object-side surface S15 of the eighth lens 118, the straight distance D82 from the optical axis to the effective diameter of the image-side surface S16 of the eighth lens 118, the straight distances D92 from the optical axis to the effective diameter of the image-side surface S18 of the ninth lens 119 are larger than the straight distances inf81, inf82, and inf92 from the eighth and ninth lenses 118 and 119 to the inflection point. Accordingly, it is possible to provide an effective diameter outside the inflection point, thereby improving the refractive power of light.

By Equations 25 to 29, the refractive power of light in the eighth and ninth lenses 118 and 119 may be improved by the relationship between the distances or optical axis distances from the apexes of the object-side surface S15 and the image-side surface S16 of the eighth lens 118 to the effective diameter, and the distances from the apex of the object-side surface S17 and the image-side surface S18 of the ninth lens 119 to the effective diameter, and the straight distance from the optical axis to the effective diameter. In addition, the relationship between the distance D11 from the apex of the object-side surface of the first lens 111 to the effective diameter and the distance D92 from the apex of the image-side surface of the ninth lens 119 to the effective diameter may be limited.

The optical system according to the first to third embodiments of the invention may satisfy at least one, two or more, five or more, or all of Equations 1 to 29. In this case, the optical system may implement a high-quality and high-resolution imaging lens system. In addition, unnecessary light entering the optical system may be blocked by at least one of Equations 1 to 29, aberration may be corrected, and performance of the optical system may be improved.

Figure 15:
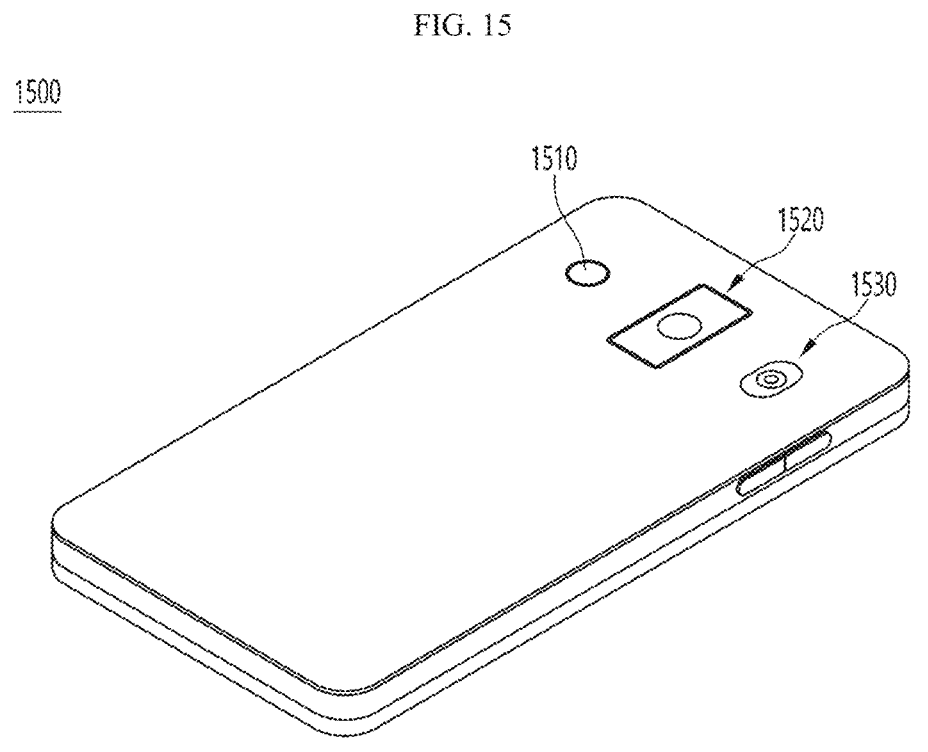

FIG. 15 is a perspective view illustrating an example of a moving device to which an optical system according to an embodiment(s) of the invention is applied. As shown in FIG. 15, the mobile terminal 1500 may include a camera module 1520, a flash module 1530, and an auto-focus device 1510 provided on one side or the rear side. Here, the autofocus device 1510 may include a surface light emitting laser device and a light receiving unit as a light emitting layer. The flash module 1530 may include an emitter emitting light therein. The flash module 1530 may be operated by a camera operation of a mobile terminal or a user's control. The camera module 1520 may include an image capturing function and an auto focus function. For example, the camera module 1520 may include an auto-focus function using an image. The auto-focus device 1510 may include an auto-focus function using a laser. The auto focus device 1510 may be mainly used in a condition in which the auto focus function using the image of the camera module 1520 is deteriorated, for example, in proximity of 10 m or less or in a dark environment.

Features, structures, effects, etc. described in the above embodiments are included in at least one embodiment of the invention, and are not necessarily limited to only one embodiment. Furthermore, features, structures, effects, etc. illustrated in each embodiment may be combined or modified for other embodiments by those of ordinary skill in the art to which the embodiments belong. Accordingly, the contents related to such combinations and modifications should be interpreted as being included in the scope of the invention.

In addition, although the embodiment has been described above, it is only an example and does not limit the invention, and those of ordinary skill in the art to which the invention pertains are exemplified above in a range that does not depart from the essential characteristics of the present embodiment. It may be seen that various modifications and applications that have not been made are possible. For example, each component specifically shown in the embodiment may be implemented by modification. And the differences related to these modifications and applications should be construed as being included in the scope of the invention defined in the appended claims.

The invention claimed is:

1. An optical system comprising:

a first lens, a second lens, a third lens, a fourth lens, a fifth lens, a sixth lens, a seventh lens, an eighth lens, and a ninth lens sequentially arranged along an optical axis from an object side to an image side, wherein the first lens has a convex object-side surface, wherein the second lens has a convex object-side surface, wherein the third lens has a positive refractive power and has a convex object-side surface, wherein the fourth lens has a negative refractive power and has a concave image-side surface, wherein the eighth lens has a positive refractive power, and at least one of an object-side surface and an image-side surface of the eighth lens has at least one inflection point, wherein the ninth lens has a negative refractive power, and an object-side surface and an image-side surface of the ninth lens have at least one inflection point, wherein a center thickness of the third lens is thicker than a center thickness of each of the first and second lenses, wherein the object-side surface of the ninth lens has a convex shape on the optical axis,

wherein the fifth lens has a positive refractive power and the sixth lens and the seventh lens each has a negative refractive power, and wherein each of refractive indices of the fourth, sixth, and eighth lenses is greater than each of refractive indices of the first, second, third, fifth, seventh, and ninth lenses.

2. The optical system of claim 1, wherein Abbe numbers of the first, second, fifth, seventh and ninth lenses are 50 or more, and Abbe numbers of the third and sixth lenses are less than 30.

3. The optical system of claim 1, comprising an image sensor on an image side of the ninth lens; and an optical filter between the image sensor and the ninth lens, wherein the optical system satisfies Equations 1 and 2:

$$0 < BFL/TTL < 0.3 \quad \text{[Equation 1]}$$
$$0 < BFL/Img < 0.3 \quad \text{[Equation 2]}$$

where BFL is a distance from an apex of the image-side surface of the ninth lens to the image sensor, TTL is a distance from an apex of an object-side surface of the first lens to the image sensor, and Img is a vertical distance from the optical axis to 1.0F, which is a diagonal end on the image sensor.

4. The optical system of claim 1, comprising an image sensor on an image side of the ninth lens and an optical filter between the image sensor and the ninth lens, wherein the optical system satisfies Equations 3, 4, and 5:

$$0.5 < F/TTL < 1.2 \quad \text{[Equation 3]}$$
$$0.5 < TTL/(Img \times 2) < 0.8 \quad \text{[Equation 4]}$$
$$0.5 < TTL/(D92 \times 2) < 1.2 \quad \text{[Equation 5]}$$

where TTL is a distance from an apex of an object-side first surface of the first lens to the image sensor, F is a total effective focal length of the optical system, Img is a vertical distance from the optical axis to 1.0F, which is a diagonal end on the image sensor, and D92 is a distance from an apex of the image-side surface of the ninth lens to an effective diameter with respect to the optical axis.

5. The optical system of claim 1, wherein a radius of curvature of the object-side surface of the third lens is L3R1, and an absolute value of a radius of curvature of an image-side surface of the third lens is defined as |L3R2|, wherein the optical system is configured to satisfy following condition: 0<L3R1/|L3R2|<0.5.

6. The optical system of claim 1, wherein an absolute value of a radius of curvature of an object-side surface of the fourth lens is |L4R1|, and a radius of curvature of an image-side surface of the fourth lens is LAR2, wherein the optical system satisfies a relationship of 0.2<L4R2/|L4R1|<1.

7. The optical system of claim 1, wherein a refractive index of the third lens at 587 nm is G3 and a refractive index of the fourth lens at 587 nm is G4, wherein the optical system satisfies a relationship of 0.7<G3/G4<1.2.

8. The optical system of claim 1, wherein the center thickness of the first lens is T1, the center thickness of the second lens is T2, and the center thickness of the third lens is T3, wherein the optical system satisfies relationships of 0.2<T2/T3<1 and 0.2<T1/T3<1.

9. The optical system of claim 1, wherein the center thickness of the third lens is thicker than a center thickness of each of the fourth to sixth lenses.

10. An optical system comprising:

a first lens, a second lens, a third lens, a fourth lens, a fifth lens, a sixth lens, a seventh lens, an eighth lens, and a ninth lens sequentially arranged along an optical axis from an object side to an image side, wherein the first lens has a convex object-side surface, wherein the second lens has a convex object-side surface, wherein the third lens has a positive refractive power and has a convex object-side surface, wherein the fourth lens has a negative refractive power and has a concave image-side surface, wherein the eighth lens has a positive refractive power, and at least one of an object-side surface and an image-side surface of the eighth lens has at least one inflection point, wherein the ninth lens has a negative refractive power, and an object-side surface and an image-side surface of the ninth lens have at least one inflection point, wherein a center thickness of the third lens is thicker than a center thickness of each of the first and second lenses, wherein the object-side surface of the ninth lens has a convex shape on the optical axis, wherein the center thickness of the third lens is thicker than a center thickness of each of the fourth to sixth lenses, and wherein each of refractive indices of the fourth, sixth, and eighth lenses is greater than each of refractive indices of the first, second, third, fifth, seventh, and ninth lenses.

11. An optical system comprising:

a first lens, a second lens, a third lens, a fourth lens, a fifth lens, a sixth lens, a seventh lens, an eighth lens, and a ninth lens sequentially arranged along an optical axis from an object side to an image side, wherein the first lens has a positive or negative refractive power and has a convex object-side surface and a concave image-side surface, wherein the third lens has a positive refractive power and a convex object-side surface and a convex image-side surface, wherein the fourth lens has a negative refractive power and has a concave image-side surface, wherein the eighth lens has a positive refractive power, and at least one of an object-side surface and an image-side surface of the eighth lens has at least one inflection point, wherein the ninth lens has a negative refractive power, and each of an object-side surface and an image-side surface of the ninth lens has at least one inflection point, wherein a center thickness of the third lens is thicker than a center thickness of each of the first, second, and fourth to sixth lenses, wherein an edge of the object-side surface of the eighth lens protrudes toward the first lens more than an apex on the optical axis of the object-side surface of the eighth lens, wherein a straight line connecting edges of the object-side surface of the eighth lens is same as or is located closer to the first lens than a straight line orthogonal to the optical axis located at a middle point between an object-side surface and an image-side surface of the seventh lens, and wherein the object-side surface of the ninth lens has a convex shape on the optical axis.

12. The optical system of claim 11, wherein the straight line connecting the edges of the object-side surface of the eighth lens is located closer to the first lens than a straight line orthogonal to the optical axis at an apex of an object-side surface of the seventh lens.

13. The optical system of claim 12, wherein the center thickness of the third lens is in a range of 2 to 4 times the center thickness of the fourth lens.

14. The optical system of claim 11, wherein an interval between the third lens and the fourth lens along the optical axis is greater than a first interval between the first lens and the second lens, and wherein a second interval between the eighth lens and the ninth lens along the optical axis is greater than the first interval.

15. The optical system of claim 14, wherein the first interval and the second interval are 0.7 mm or more.

16. The optical system of claim 11, wherein refractive indices of the fourth, sixth, and eighth lenses are greater than refractive indices of the first, second, third, fifth, seventh, and ninth lenses.

17. The optical system of claim 11, wherein Abbe numbers of the first, second, fifth, seventh and ninth lenses are 50 or more, and Abbe numbers of the third and sixth lenses are less than 30.

18. The optical system of claim 11, wherein a radius of curvature of the object-side surface of the third lens is L3R1, and an absolute value of a radius of curvature of an image-side surface of the third lens is defined as |L3R2|, wherein the optical system is configured to satisfy following condition: 0<L3R1/|L3R2|<0.5.

\* \* \* \* \*